US012775269B2

(12) United States Patent
Ikeda

(10) Patent No.: US 12,775,269 B2
(45) Date of Patent: Oct. 27, 2026

(54) MANUFACTURING LINE ABNORMALITY PORTENT DETECTION APPARATUS, MANUFACTURING LINE ABNORMALITY PORTENT DETECTION METHOD, MANUFACTURING LINE ABNORMALITY PORTENT DETECTION PROGRAM, MANUFACTURING APPARATUS, AND INSPECTION APPARATUS

(71) Applicant: FUJIFILM Corporation, Tokyo (JP)

(72) Inventor: Haruka Ikeda, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 394 days.

(21) Appl. No.: 18/484,898

(22) Filed: Oct. 11, 2023

(65) Prior Publication Data

US 2024/0045407 A1 Feb. 8, 2024

Related U.S. Application Data

(63) Continuation of application No. PCT/JP2022/012546, filed on Mar. 18, 2022.

(30) Foreign Application Priority Data

Apr. 19, 2021 (JP) ................................ 2021-070135

(51) Int. Cl.
*G05B 19/418* (2006.01)
*G06T 7/00* (2017.01)

(52) U.S. Cl.
CPC ...... *G05B 19/41875* (2013.01); *G06T 7/0004* (2013.01)

(58) Field of Classification Search
CPC .......... G05B 19/4184; G05B 19/41875; G05B 2219/11; G06T 7/00; G06T 7/0004; G06T 7/001

(Continued)

(56) References Cited

U.S. PATENT DOCUMENTS

2001/0042705 A1* 11/2001 Nakagaki ........... G01N 21/9501 209/571
2006/0274932 A1* 12/2006 Ikeda .................... G06T 7/0004 382/145

(Continued)

FOREIGN PATENT DOCUMENTS

CN 101197301 A 6/2008
EP 3106948 A1 12/2016

(Continued)

OTHER PUBLICATIONS

Communication pursuant to Article 94(3) EPC issued by the European Patent Office on Oct. 27, 2025, which corresponds to European Patent Application No. 22 791 436.3-1201 and is related to U.S. Appl. No. 18/484,898.

(Continued)

*Primary Examiner* — Chun Cao
(74) *Attorney, Agent, or Firm* — Studebaker Brackett PLLC

(57) ABSTRACT

A processor of a manufacturing line abnormality portent detection apparatus acquires an image obtained by imaging a product manufactured by a manufacturing line using a radiography apparatus for each product, and acquires significant point information related to a significant point of the product based on the acquired image. The processor stores information that affects a determination of presence or absence of a defect of the product as defect related information and information that does not affect the determination of the presence or absence of the defect of the product as defect unrelated information, among pieces of the significant point information, in a memory. The processor calculates a line evaluation value indicating a soundness degree of the manufacturing line based on the defect related information and the defect unrelated information, and (Continued)

detects an abnormality sign of the manufacturing line based on the calculated line evaluation value.

26 Claims, 10 Drawing Sheets

(58) Field of Classification Search
USPC .......................................................... 700/110
See application file for complete search history.

(56) References Cited

U.S. PATENT DOCUMENTS

| | | | |
|---|---|---|---|
| 2008/0247630 A1 | 10/2008 | Horiuchi | |
| 2008/0298670 A1 | 12/2008 | Nakagaki et al. | |
| 2012/0221586 A1 | 8/2012 | Kawata et al. | |
| 2019/0223337 A1* | 7/2019 | Mori | H05K 13/08 |
| 2020/0043407 A1* | 2/2020 | Konishi | G01J 1/4228 |
| 2021/0182979 A1* | 6/2021 | Mutobe | G06Q 10/06395 |
| 2021/0183037 A1* | 6/2021 | Kurita | G06T 3/40 |
| 2021/0299872 A1 | 9/2021 | Wu et al. | |
| 2022/0043812 A1* | 2/2022 | Tang | G06F 16/906 |

FOREIGN PATENT DOCUMENTS

| | | |
|---|---|---|
| JP | 2008-015930 A | 1/2008 |
| JP | 2008-294361 A | 12/2008 |
| JP | 2012-089634 A | 5/2012 |
| JP | 2012-242982 A | 12/2012 |
| JP | 2020-024484 A | 2/2020 |
| JP | 2020-027425 A | 2/2020 |
| JP | 2020-061109 A | 4/2020 |
| JP | 6680430 B1 | 4/2020 |

OTHER PUBLICATIONS

International Search Report issued in PCT/JP2022/012546; mailed Jun. 7, 2022.

Written Opinion of the International Searching Authority issued in PCT/JP2022/012546; mailed Jun. 7, 2022.

The extended European search report issued by the European Patent Office on Sep. 12, 2024, which corresponds to European Patent Application No. 22791436.3-1201 and is related to U.S. Appl. No. 18/484,898.

Office Action issued in CN 202280027700.2; mailed by the China National Intellectual Property Administration on Apr. 4, 2026.

Communication pursuant to Article 94(3) EPC issued by the European Patent Office on Jun. 10, 2026, which corresponds to European Patent Application No. 22 791 436.3-1201 and is related to U.S. Appl. No. 18/484,898.

An Office Action; mailed by the China National Intellectual Property Administration of the People's Republic of China on Jul. 15, 2026, which corresponds to Chinese Patent Application No. 202280027700.2 and is related to U.S. Appl. No. 18/484,898.

* cited by examiner

FIG. 5

[INSPECTION HISTORY]

| PRODUCT No. | TYPE INFORMATION OF SIGNIFICANT POINT | SIGNIFICANT POINT INFORMATION | | | |
|---|---|---|---|---|---|
| | | OCCURRENCE POSITION INFORMATION | SIZE INFORMATION | SHAPE INFORMATION | OTHERS |
| 1 | PINHOLE | LEFT END PORTION OF COMPONENT A | 0.1 mm | SPHERICAL SHAPE | |
| 2 | CRACK | CENTRAL PORTION OF COMPONENT B | 3.0 mm | LINEAR SHAPE | |
| | | | | | |

FIG. 6

[FIRST CORRESPONDENCE TABLE (FIRST EXAMPLE)]

| SIGNIFICANT POINT INFORMATION (SIGNIFICANT POINT OCCURRENCE COMPONENT) | MANUFACTURING PROCESS |
|---|---|
| A : 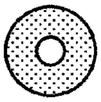 | MANUFACTURING PROCESS 1 |
| B : 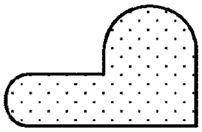 | MANUFACTURING PROCESS 2 |
| ⋮ | ⋮ |
| C :  | MANUFACTURING PROCESS N |

FIG. 7

[FIRST CORRESPONDENCE TABLE (SECOND EXAMPLE)]

| SIGNIFICANT POINT INFORMATION (TYPE OF SIGNIFICANT POINT) | MANUFACTURING PROCESS |
|---|---|
| PINHOLE | MANUFACTURING PROCESS 3 |
| WELDING DEFECT | MANUFACTURING PROCESS 4 |
| ⋮ | ⋮ |

FIG. 8

| | LOT I | LOT II | LOT III |
|---|---|---|---|
| MANUFACTURING PROCESS 1 | 0 | 1 | 0 |
| MANUFACTURING PROCESS 2 | 0 | 1 | 15 |
| | ⋮ | ⋮ | ⋮ |
| MANUFACTURING PROCESS N | 1 | 2 | 2 |

FIG. 9

[SECOND CORRESPONDENCE TABLE]

| SIGNIFICANT POINT INFORMATION (TYPE OF SIGNIFICANT POINT) | MANUFACTURING ENVIRONMENT |
|---|---|
| PINHOLE | $CO_2$ EXCESS |
| CRACK DEFECT | INAPPROPRIATE HUMIDITY/WELDING TEMPERATURE RANGE |
| ⋮ | ⋮ |

FIG. 10

| QUALITY OF PRODUCT GROUP | ADDITIONAL INFORMATION | |
|---|---|---|
| | JOINING METHOD | INTENDED USE |
| BEST EXCELLENT QUALITY PRODUCT | SCREW JOINING | ORIGINAL APPARATUS |
| EXCELLENT QUALITY PRODUCT | PRESS-FITTING OR BAKING-FITTING | ORIGINAL APPARATUS |
| GOOD QUALITY PRODUCT | PRESS-FITTING OR BAKING-FITTING | USABLE FOR USE X |
| ⋮ | ⋮ | ⋮ |

FIG. 11
(A)
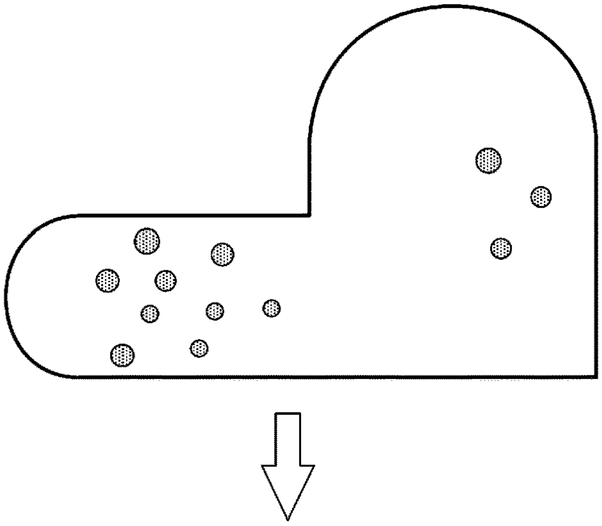
(B)
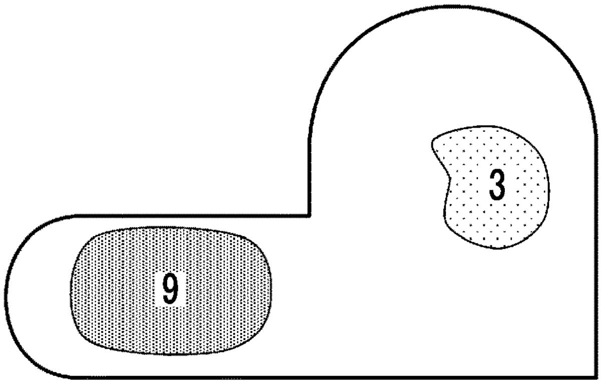
FIG. 12
(A)
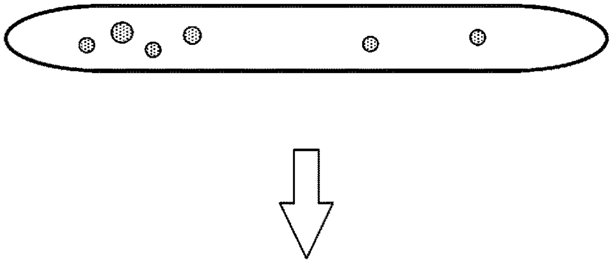
(B)
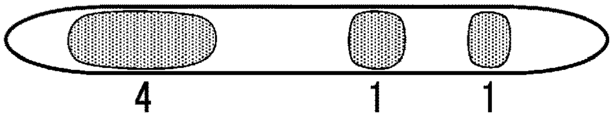

MANUFACTURING LINE ABNORMALITY PORTENT DETECTION APPARATUS, MANUFACTURING LINE ABNORMALITY PORTENT DETECTION METHOD, MANUFACTURING LINE ABNORMALITY PORTENT DETECTION PROGRAM, MANUFACTURING APPARATUS, AND INSPECTION APPARATUS

CROSS-REFERENCE TO RELATED APPLICATIONS

The present application is a Continuation of PCT International Application No. PCT/JP2022/012546 filed on Mar. 18, 2022 claiming priority under 35 U.S.C § 119(a) to Japanese Patent Application No. 2021-070135 filed on Apr. 19, 2021. Each of the above applications is hereby expressly incorporated by reference, in its entirety, into the present application.

BACKGROUND OF THE INVENTION

1. Field of the Invention

The present invention relates to a manufacturing line abnormality portent detection apparatus, a manufacturing line abnormality portent detection method, a manufacturing line abnormality portent detection program, a manufacturing apparatus, and an inspection apparatus, and particularly to a technique of detecting an abnormality sign of a manufacturing line from a product manufactured by the manufacturing line.

2. Description of the Related Art

At a manufacturing site of a metal component and the like, the presence or absence of a defect is inspected before shipment. On the other hand, it is difficult to inspect a problem on a machine that manufactures a product every time due to the inspection cost or the necessity of continuous production, and it is necessary to perform maintenance or the like for each certain period or to perform the inspection after the problem occurs, and thus it is difficult to detect an abnormality at an early stage.

On the other hand, the related art proposes a production management method of a manufacturing line including a manufacturing process of forming a product by assembling a plurality of components, and an inspection process of inspecting an inspection target with each component or product as the inspection target, in which, in the inspection process, the inspection target is imaged according to a preset rule, and the image accompanying the imaging is processed, and a management process of determining a quality of the product by comparing a processing result with a quality determination value, sequentially accumulating the processing results of the image and determining a content thereof, and reflecting a determination result in the manufacturing process is further included (JP2008-15930A).

In the production management method of the manufacturing line described in JP2008-15930A, specifically, an outer surface of the product is imaged with a camera by emitting light from an illumination device toward the outer surface of the product, and receiving reflected light that is reflected by the outer surface with a camera.

Among scratches that occurs on a surface of the inspection target, an upper limit level for mainly detecting a bright scratch and a lower limit level for detecting a black result, a surface roughness, or the like that occurs on the surface of the inspection target are set in association with a brightness level of a video signal obtained from the camera, and in the production management method of the manufacturing line, information related to the video signal obtained by the imaging is sequentially accumulated in a storage medium as digital data, and in a case in which a level of the video signal exceeds a standard value and indicates a tendency to approach the upper limit level or the level of the video signal falls below the standard value and indicates a tendency to approach the lower limit level, an assembly method in the manufacturing process is changed based on this information to prevent the occurrence of the abnormality in the next manufactured product.

SUMMARY OF THE INVENTION

JP2008-15930A describes that the information related to the video signal obtained by imaging the product or the component thereof is sequentially accumulated in the storage medium as the digital data, and in a case in which the level of the video signal exceeds the standard value and indicates the tendency to approach the upper limit level or the level of the video signal falls below the standard value and indicates the tendency to approach the lower limit level, the assembly method in the manufacturing process is changed based on this information to prevent the occurrence of the abnormality in the next manufactured product. However, there is no description that an abnormality sign of the manufacturing line is detected in also consideration of the level of the video signal (information that does not affect the determination of the presence or absence of the defect of the product) which cannot be said to be the defect.

The present invention has been made in view of such circumstances, and is to provide a manufacturing line abnormality portent detection apparatus, a manufacturing line abnormality portent detection method, a manufacturing line abnormality portent detection program, a manufacturing apparatus, and an inspection apparatus capable of detecting an abnormality sign of a manufacturing line at an early stage without delay and capable of performing inspection of a product.

In order to achieve the above-described object, a first aspect of the present invention relates to a manufacturing line abnormality portent detection apparatus comprising: a processor; an imaging apparatus; a first memory; and a second memory, in which the processor performs imaging processing of imaging a product as an inspection target manufactured by a manufacturing line one by one by using the imaging apparatus, significant point information acquisition processing of acquiring significant point information related to a significant point of the product based on an image acquired by the imaging, significant point information storage processing of storing the acquired significant point information in the first memory, storage processing of storing information that affects a determination of presence or absence of a defect of the product in the second memory as defect related information and storing information that does not affect the determination of the presence or absence of the defect of the product in the second memory as defect unrelated information, among pieces of the significant point information stored in the first memory, product evaluation value calculation processing of calculating a product evaluation value indicating a soundness degree of the product based on the defect related information, defect detection processing of detecting the presence or absence of the defect of the product based on the product evaluation value calculated by the product evaluation value calculation processing, line evaluation value calculation processing of calculating a line evaluation value indicating a soundness degree of the manufacturing line based on the defect related information and the defect unrelated information, abnormality sign detection processing of detecting an abnormality sign of the manufacturing line based on the line evaluation value calculated by the line evaluation value calculation processing, and output processing of outputting feedback information including a detection result of the abnormality sign of the manufacturing line and a detection result of the defect of the product.

According to the first aspect of the present invention, the product manufactured by the manufacturing line is imaged by using the imaging apparatus one by one, the significant point information related to the significant point of each product is acquired based on the image acquired by the imaging, the acquired significant point information is stored in the first memory, and the information that affects the determination of the presence or absence of the defect of the product as the defect related information and the information that does not affect the determination of the presence or absence of the defect of the product as the defect unrelated information, among pieces of the significant point information stored in the first memory, are further stored in the second memory. Then, the product evaluation value indicating the soundness degree of the product is calculated based on the defect related information, and the presence or absence of the defect of the product is detected based on the calculated product evaluation value. In addition, the line evaluation value indicating the soundness degree of the manufacturing line is calculated based on the defect related information and the defect unrelated information (classified significant point information) stored in the second memory, and the abnormality sign of the manufacturing line is detected based on the calculated line evaluation value. As a result, the abnormality sign of the manufacturing line can be detected at an early stage without delay in consideration of various pieces of the significant point information constituting the inspection history of the product manufactured by the manufacturing line (also in consideration of the significant point information that does not affect the determination of the presence or absence of the defect of the product). In addition, by outputting the feedback information including the detection result of the abnormality sign of the manufacturing line and the detection result of the defect of the product, appropriate countermeasures can be taken for the manufacturing line automatically or by the user, and the inspection of the product can be performed.

In the manufacturing line abnormality portent detection apparatus according to a second aspect of the present invention, it is preferable that the processor performs defect portent value calculation processing of calculating a defect portent value based on the defect unrelated information, and notification processing of giving notification of the defect portent value. As a result, it is possible to predict a possibility of future occurrence of the defect or a time of the occurrence of the defect in a case in which the product is continuously manufactured on the manufacturing line.

In the manufacturing line abnormality portent detection apparatus according to a third aspect of the present invention, it is preferable that the imaging apparatus is a radiography apparatus, an ultrasound imaging apparatus, or an infrared imaging apparatus. As a result, the significant point inside the product can also be imaged, and a non-destructive inspection of the product can be performed.

In the manufacturing line abnormality portent detection apparatus according to a fourth aspect of the present invention, it is preferable that the significant point information is one or more of type information, occurrence position information, size information, or shape information of the significant point, and in the storage processing, the significant point information is classified into the defect related information and the defect unrelated information based on one or more of the type information, the occurrence position information, the size information, or the shape information of the significant point, and stored in the second memory.

In the manufacturing line abnormality portent detection apparatus according to a fifth aspect of the present invention, it is preferable that, in the line evaluation value calculation processing, the line evaluation value indicating the soundness degree of the manufacturing line is calculated based on at least one piece of the defect related information stored in the second memory and at least two or more pieces of the defect unrelated information stored in the second memory.

In the manufacturing line abnormality portent detection apparatus according to a sixth aspect of the present invention, it is preferable that, in the line evaluation value calculation processing, the line evaluation value indicating the soundness degree of the manufacturing line is calculated based on two or more pieces of the defect related information stored in the second memory and two or more pieces of the defect unrelated information stored in the second memory.

In the manufacturing line abnormality portent detection apparatus according to a seventh aspect of the present invention, it is preferable that, in the line evaluation value calculation processing, the line evaluation value indicating the soundness degree of the manufacturing line is calculated based on the defect related information and the defect unrelated information stored in the second memory and corresponding to a plurality of the products.

In the manufacturing line abnormality portent detection apparatus according to an eighth aspect of the present invention, it is preferable that the plurality of products are a product group manufactured within a certain period, a certain number of product groups manufactured in time series, or a product group of one lot which is a unit for managing the product. It should be noted that, in the product group manufactured within a certain period or a certain number of the product groups, some products may be duplicate between other product groups.

In the manufacturing line abnormality portent detection apparatus according to a ninth aspect of the present invention, it is preferable that, in the line evaluation value calculation processing, the defect related information and the defect unrelated information are counted, and the line evaluation value is calculated based on a count value obtained by the counting. The line evaluation value may be obtained as an average value obtained by dividing the count value by the number of target products in addition to a case in which the count value itself is used as the line evaluation value.

In the manufacturing line abnormality portent detection apparatus according to a tenth aspect of the present invention, it is preferable that, in the line evaluation value calculation processing, in a case in which the defect related information and the defect unrelated information are counted, the defect related information and the defect unrelated information are weighted and counted. It should be noted that the significant point information classified into the defect related information may be further weighted differently, or the significant point information classified into the defect unrelated information may be further weighted differently.

In the manufacturing line abnormality portent detection apparatus according to an eleventh aspect of the present invention, it is preferable that, in the line evaluation value calculation processing, in a case in which the defect related information is counted, the defect related information is counted by performing weighting corresponding to a type of the defect related information. Examples of the type of the defect related information include the type information of the significant point, the occurrence position information, the size information, the shape information, and a degree of relation to the defect.

In the manufacturing line abnormality portent detection apparatus according to a twelfth aspect of the present invention, it is preferable that, in the abnormality sign detection processing, two or more line evaluation values are compared, and the abnormality sign of the manufacturing line is detected based on a comparison result obtained by the comparison. By comparing the line evaluation values calculated from the inspection histories of two or more products having different manufacturing times, the feedback information such that the product produced at a certain manufacturing time includes more defect related information than the product produced at another manufacturing time can be extracted, the abnormality sign of the manufacturing line can be detected, and the notification can be given.

In the manufacturing line abnormality portent detection apparatus according to a thirteenth aspect of the present invention, it is preferable that the manufacturing line includes a plurality of manufacturing processes, the significant point information is one or more of type information, occurrence position information, size information, or shape information of the significant point, the manufacturing line abnormality portent detection apparatus further comprises a third memory that stores a first correspondence table in which specific significant point information included in the significant point information and a specific manufacturing process related to the specific significant point information among the plurality of manufacturing processes of the manufacturing line are associated with each other, in the line evaluation value calculation processing, in a case in which the defect related information and the defect unrelated information are counted, the defect related information and the defect unrelated information are counted for each of the plurality of manufacturing processes according to the first correspondence table, and a count value for each manufacturing process obtained by the counting is calculated as a process evaluation value indicating a soundness degree of each manufacturing process, and in the abnormality sign detection processing, an abnormality sign of each manufacturing process of the manufacturing line is detected based on the process evaluation value calculated for each manufacturing process. Accordingly, a manufacturing process having a possibility of deterioration among the plurality of manufacturing processes can be specified, and appropriate countermeasures can be taken.

In the manufacturing line abnormality portent detection apparatus according to a fourteenth aspect of the present invention, it is preferable that the significant point information is one or more of type information, occurrence position information, size information, or shape information of the significant point, the manufacturing line abnormality portent detection apparatus further comprises a fourth memory that stores a second correspondence table in which specific significant point information included in the significant point information and specific environment information related to the specific significant point information among a plurality of pieces of environment information indicating a manufacturing environment in the manufacturing line are associated with each other, the processor performs processing of acquiring the specific significant point information among pieces of the specific significant point information stored in the first memory, and processing of acquiring, in a case in which the specific significant point information is acquired, the specific environment information related to the acquired specific significant point information according to the second correspondence table, and in the output processing, feedback information including the specific environment information is output. Accordingly, in a case in which the specific significant point information is acquired, the specific environment information related to the specific significant point information is acquired from the fourth memory, and the feedback information including the specific environment information is output, so that the occurrence of the defect of the product due to the environment can be reduced by adjusting the environment of the manufacturing line according to the specific environment information.

In the manufacturing line abnormality portent detection apparatus according to a fifteenth aspect of the present invention, it is preferable that the manufacturing line abnormality portent detection apparatus further comprises: a fifth memory that stores quality information indicating a quality for each product group and additional information related to the quality information in association with each other, in which the processor performs processing of acquiring the quality information related to the quality of the product group based on each inspection history of an inspection history group corresponding to the product group, and processing of acquiring the additional information corresponding to the quality information from the fifth memory based on the acquired quality information, and in the output processing, the additional information acquired to correspond to the product group is output. As the additional information acquired to correspond to the product group, information, such as a content of a post-process of the product or the intended use corresponding to the quality of the product group, can be considered.

In the manufacturing line abnormality portent detection apparatus according to a sixteenth aspect of the present invention, it is preferable that the significant point information includes occurrence position information and size information of the significant point of the product, the processor performs processing of acquiring minute significant point information indicating a minute significant point having a significant point size smaller than a threshold value based on the significant point information acquired by the significant point information acquisition processing, and processing of generating emphasis information emphasizing and displaying the minute significant point based on the acquired minute significant point information and displaying a region, which includes the minute significant point and is larger than the significant point size of the minute significant point, in a visible manner, and information corresponding to the number of the minute significant points, and in the output processing, the emphasis information and the information corresponding to the number of the minute significant points are superimposed on the image, and displayed on a display. Since it is difficult to visually recognize the minute significant point even in a case in which the region of the minute significant point is emphasized, the occurrence location of the minute significant point can be easily checked by generating the emphasis information displaying the region larger than the significant point size of the minute significant point in a visible manner and the information corresponding to the number of the minute significant points, superimposing these pieces of the information on the image, and displaying these pieces of the information on the display.

In the manufacturing line abnormality portent detection apparatus according to a seventeenth aspect of the present invention, it is preferable that the emphasis information is mask information filling the region larger than the significant point size of the minute significant point with at least one of a specific color or brightness, or frame information surrounding the region, and the information corresponding to the number of the minute significant points is character information indicating the number or information on at least one of a color or brightness of the emphasis information corresponding to the number.

In the manufacturing line abnormality portent detection apparatus according to an eighteenth aspect of the present invention, it is preferable that, in the significant point information acquisition processing, a feature amount of the image is extracted, and a defect probability of the significant point information is acquired for each pixel of the image, and in the output processing, a color corresponding to the defect probability is added to a pixel corresponding to the significant point information, and displayed on a display. By adding the color corresponding to the defect probability to the pixel corresponding to the significant point information, the significant point region can be displayed as a gradation or a heat map corresponding to the defect probability. The color corresponding to the defect probability of the significant point information includes at least one of a hue or a chroma saturation.

A nineteenth aspect of the present invention relates to a manufacturing apparatus comprising: a manufacturing line for manufacturing a product; a processor; an imaging apparatus; a first memory; and a second memory, in which the processor performs imaging processing of imaging the product manufactured by the manufacturing line one by one by using the imaging apparatus, significant point information acquisition processing of acquiring significant point information related to a significant point of the product based on an image acquired by the imaging, significant point information storage processing of storing the acquired significant point information in the first memory, storage processing of storing information that affects a determination of presence or absence of a defect of the product in the second memory as defect related information and storing information that does not affect the determination of the presence or absence of the defect of the product in the second memory as defect unrelated information, among pieces of the significant point information stored in the first memory, product evaluation value calculation processing of calculating a product evaluation value indicating a soundness degree of the product based on the defect related information, defect detection processing of detecting the presence or absence of the defect of the product based on the product evaluation value calculated by the product evaluation value calculation processing, line evaluation value calculation processing of calculating a line evaluation value indicating a soundness degree of the manufacturing line based on the defect related information and the defect unrelated information, abnormality sign detection processing of detecting an abnormality sign of the manufacturing line based on the calculated line evaluation value, and output processing of outputting feedback information including a detection result of the abnormality sign of the manufacturing line and a detection result of the defect of the product.

A twentieth aspect of the present invention relates to an inspection apparatus comprising: a processor; an imaging apparatus; a first memory; and a second memory, in which the processor performs imaging processing of imaging a product as an inspection target manufactured by a manufacturing line one by one by using the imaging apparatus, significant point information acquisition processing of acquiring significant point information related to a significant point of the product based on an image acquired by the imaging, significant point information storage processing of storing the acquired significant point information in the first memory, storage processing of storing information that affects a determination of presence or absence of a defect of the product in the second memory as defect related information and storing information that does not affect the determination of the presence or absence of the defect of the product in the second memory as defect unrelated information, among pieces of the significant point information stored in the first memory, product evaluation value calculation processing of calculating a product evaluation value indicating a soundness degree of the product based on the defect related information, defect detection processing of detecting the presence or absence of the defect of the product based on the product evaluation value calculated by the product evaluation value calculation processing, line evaluation value calculation processing of calculating a line evaluation value indicating a soundness degree of the manufacturing line based on the defect related information and the defect unrelated information, abnormality sign detection processing of detecting an abnormality sign of the manufacturing line based on the line evaluation value calculated by the line evaluation value calculation processing, and output processing of outputting feedback information including a detection result of the abnormality sign of the manufacturing line and a detection result of the defect of the product.

A twenty-first aspect of the present invention relates to a manufacturing line abnormality portent detection method of detecting an abnormality sign of a manufacturing line by performing processing of the following steps via a processor, the manufacturing line abnormality portent detection method comprising: a step of imaging a product as an inspection target manufactured by the manufacturing line one by one by using an imaging apparatus; a step of acquiring significant point information related to a significant point of the product based on an image acquired by the imaging; a step of storing the acquired significant point information in a first memory; a step of storing information that affects a determination of presence or absence of a defect of the product in a second memory as defect related information and storing information that does not affect the determination of the presence or absence of the defect of the product in the second memory as defect unrelated information, among pieces of the significant point information stored in the first memory; a step of calculating a product evaluation value indicating a soundness degree of the product based on the defect related information; a step of detecting the presence or absence of the defect of the product based on the product evaluation value; a step of calculating a line evaluation value indicating a soundness degree of the manufacturing line based on the defect related information and the defect unrelated information; a step of detecting the abnormality sign of the manufacturing line based on the line evaluation value; and a step of outputting feedback information including a detection result of the abnormality sign of the manufacturing line and a detection result of the defect of the product.

In the manufacturing line abnormality portent detection method according to a twenty-third aspect of the present invention, it is preferable that the imaging apparatus is a radiography apparatus, an ultrasound imaging apparatus, or an infrared imaging apparatus. This configuration is for the non-destructive inspection of the product.

A twenty-fourth aspect of the present invention relates to a manufacturing line abnormality portent detection program causing a computer to execute the manufacturing line abnormality portent detection method according to any one of the twenty-first to twenty-third aspect.

According to the aspects of the present invention, it is possible to detect the abnormality sign of the manufacturing line at an early stage without delay, and it is possible to acquire the feedback information including the detection result thereof and the detection result of the defect of the product.

BRIEF DESCRIPTION OF THE DRAWINGS

FIG. 5 is a diagram showing an example of an inspection history stored in a memory.

FIG. 6 is a diagram showing a first example of a first correspondence table in which specific significant point information included in significant point information and a specific manufacturing process related to the specific significant point information among a plurality of manufacturing processes in a manufacturing line are associated with each other.

FIG. 7 is a diagram showing a second example of the first correspondence table in which the specific significant point information included in the significant point information and the specific manufacturing process related to the specific significant point information among the plurality of manufacturing processes in the manufacturing line are associated with each other.

FIG. 8 is a diagram showing an example of a count value (process evaluation value for each manufacturing process) in a case in which a significant point of each product in a product group is counted for each manufacturing process.

FIG. 9 is a diagram showing an example of a second correspondence table in which the specific significant point information and related specific environment information are associated with each other.

FIG. 10 is a diagram showing an example of a correspondence table in which quality information indicating a quality of each product group and additional information related to the quality information are associated with each other.

FIG. 11 is a diagram showing an example of an image of a product including a minute significant point.

FIG. 12 is a diagram showing another example of the image of the product including the minute significant point.

DESCRIPTION OF THE PREFERRED EMBODIMENTS

Hereinafter, preferred embodiments of a manufacturing line abnormality portent detection apparatus, a manufacturing line abnormality portent detection method, a manufacturing line abnormality portent detection program, a manufacturing apparatus, and an inspection apparatus according to an embodiment of the present invention will be described with reference to the accompanying drawings.

[Configuration of Manufacturing Apparatus]

Figure 1:
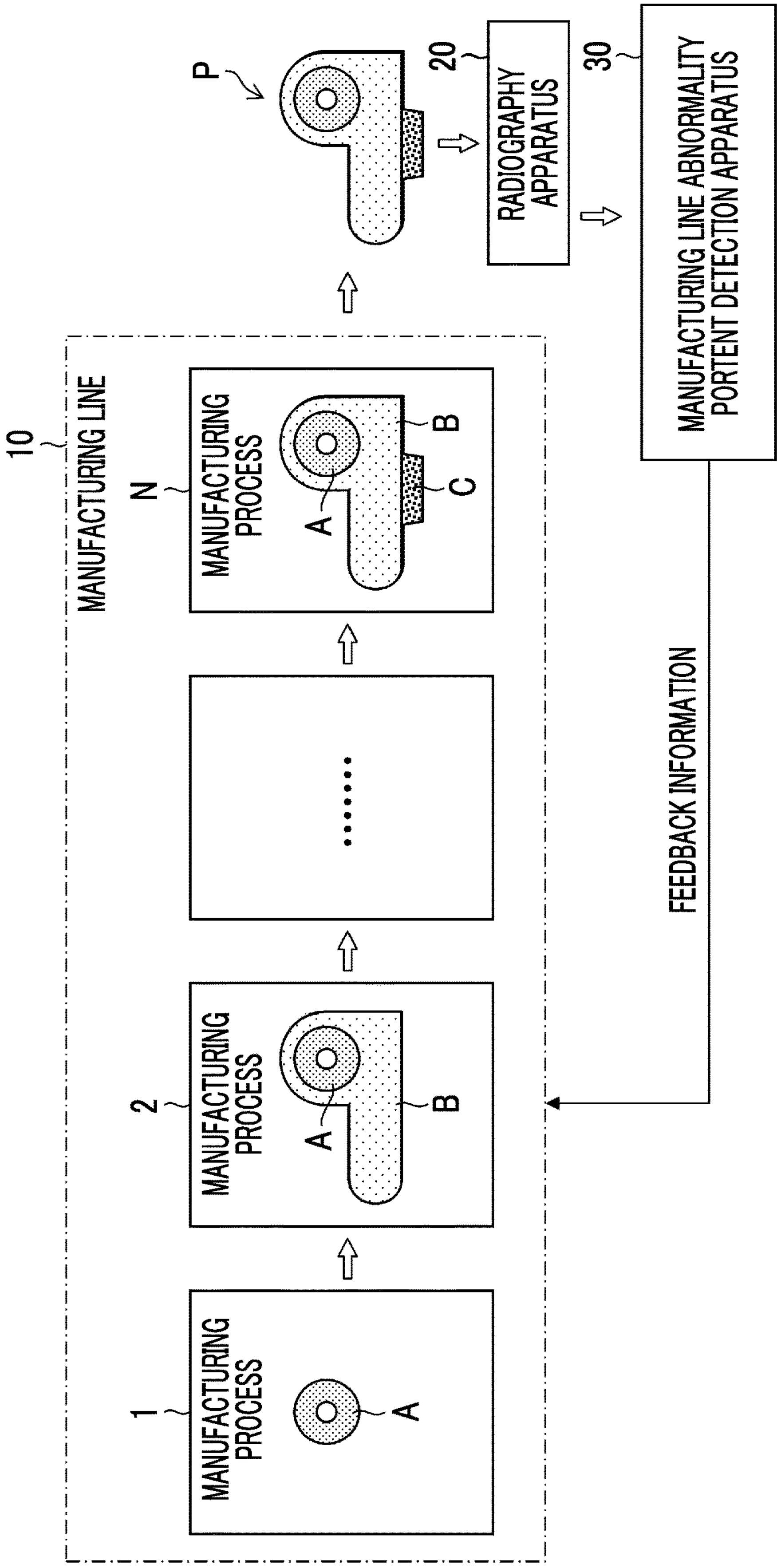
FIG. 1 is a schematic diagram showing a configuration of a manufacturing apparatus according to an embodiment of the present invention.

FIG. 1 is a schematic diagram showing a configuration of a manufacturing apparatus according to the embodiment of the present invention.

The manufacturing apparatus shown in FIG. 1 is configured of a manufacturing line 10 and a manufacturing line abnormality portent detection apparatus 30.

The manufacturing line 10 comprises a plurality of manufacturing processes from a manufacturing process 1 to a manufacturing process N, and manufactures a product P made of a metal component via each of the manufacturing processes 1 to N. For example, the manufacturing process 1 manufactures a component A, the manufacturing process 2 manufactures a component B and joins the component A and the component B, and the manufacturing process N manufactures a component C and joins the component B and the component C to manufacture the product P as a manufacturing object by the manufacturing line 10.

The manufacturing line abnormality portent detection apparatus 30 according to the embodiment of the present invention includes a radiography apparatus (imaging apparatus) 20, and functions as an inspection apparatus that performs non-destructive inspection with respect to the product P using an image captured by the radiography apparatus 20.

The products P manufactured by the manufacturing line 10 are imaged one by one by the radiography apparatus 20.

Figure 2:
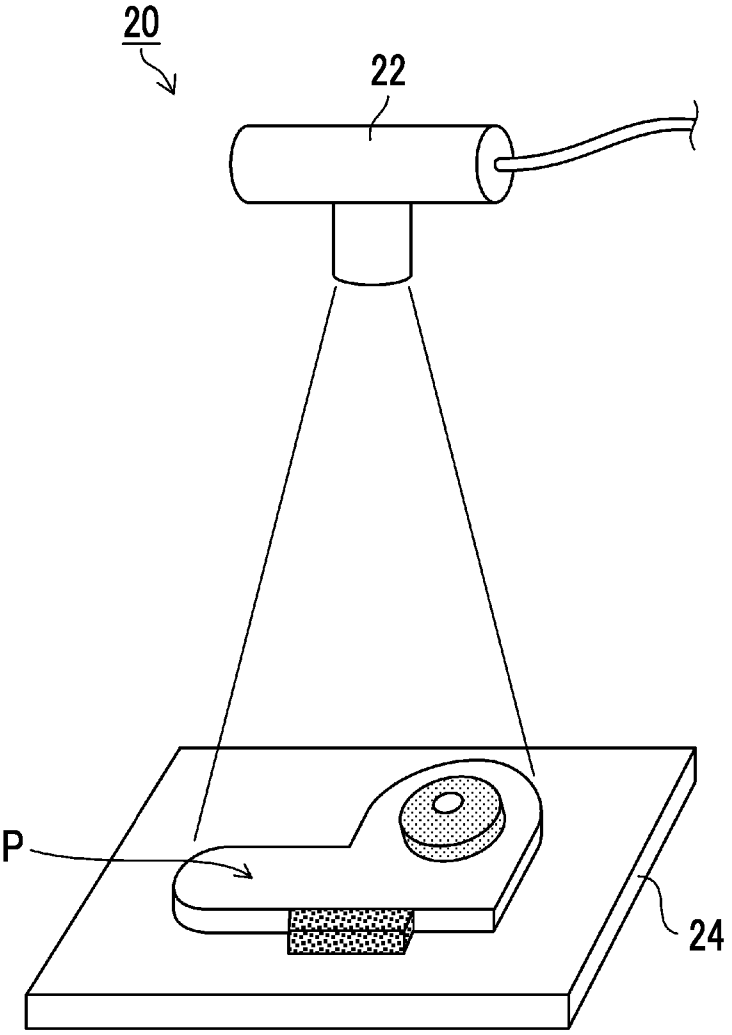
FIG. 2 is a diagram showing an example of a radiography apparatus that images a product.

FIG. 2 is a diagram showing an example of the radiography apparatus that images the product.

The radiography apparatus 20 shown in FIG. 2 is an X-ray imaging apparatus that uses X-rays as radiation, and comprises an X-ray source 22 and an imaging plate 24, in which the imaging plate 24 is disposed at a position facing the X-ray source 22 with the product P interposed therebetween.

The X-rays emitted from the X-ray source 22 pass through the product P and are incident on the imaging plate 24, and energy information (X-ray image information) corresponding to an incident dose is accumulated in the imaging plate 24. The X-ray image information accumulated in the imaging plate 24 is read by an image reading apparatus 40 shown in FIG. 3, and is taken into the manufacturing line abnormality portent detection apparatus 30 as an X-ray fluoroscopic image of the product P.

The radiography apparatus 20 is not limited to the apparatus that uses the imaging plate 24, and may be an apparatus that uses an X-ray flat panel detector, an X-ray line sensor, an X-ray film, or the like. In addition, a position and a direction for imaging the product is determined according to the product, and one product may be imaged at a plurality of locations.

The manufacturing line abnormality portent detection apparatus 30 performs the non-destructive inspection with respect to the product P based on the X-ray fluoroscopic image (hereinafter, simply referred to as "image") acquired by imaging the product P, and detects an abnormality sign of the entire manufacturing line 10 or each of the manufacturing processes 1 to N of the manufacturing line 10 based on the inspection result of the product P.

[Hardware Configuration of Manufacturing Line Abnormality Portent Detection Apparatus]

Figure 3:
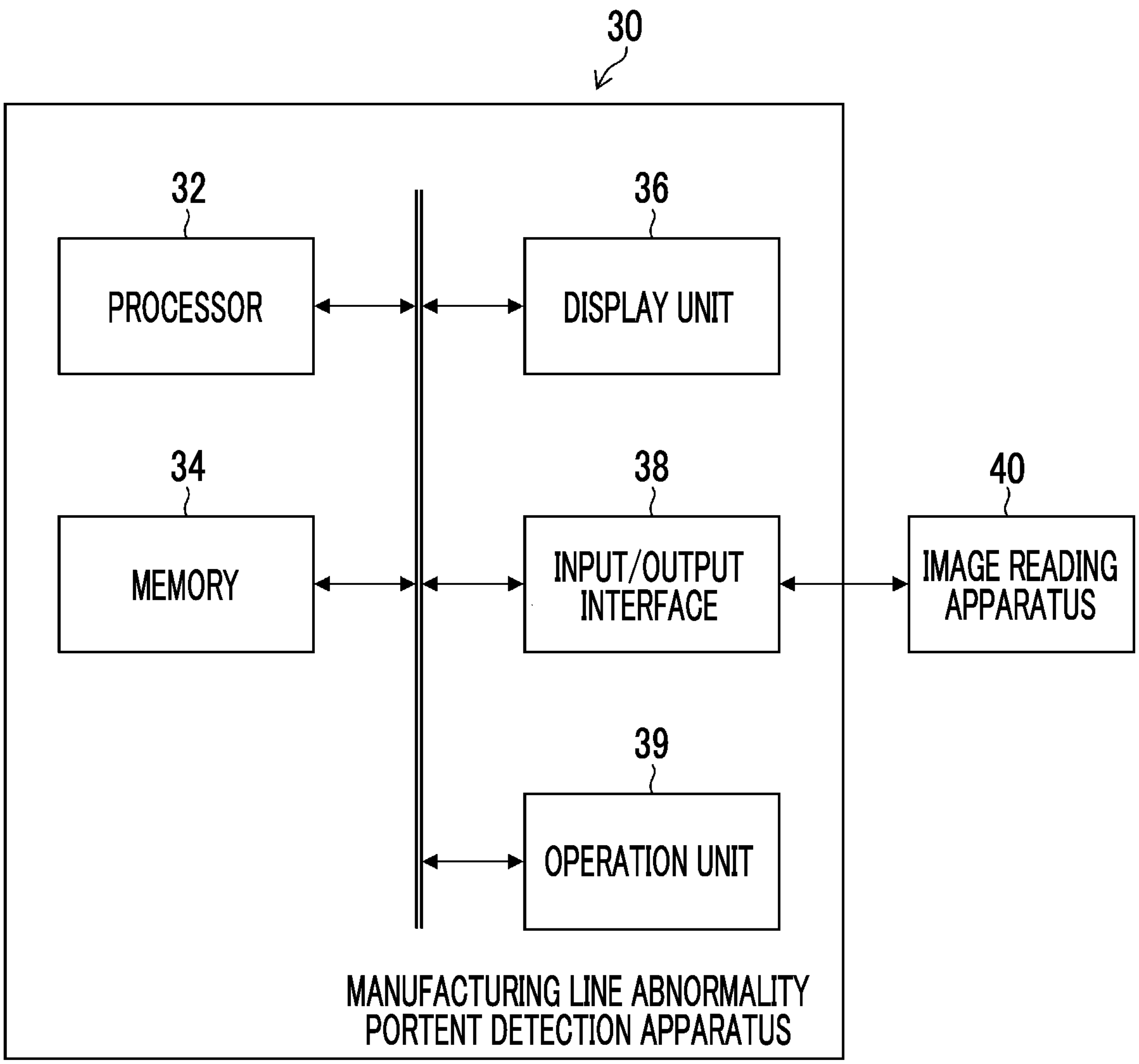
FIG. 3 is a block diagram showing an embodiment of a hardware configuration of a manufacturing line abnormality portent detection apparatus according to the embodiment of the present invention.

FIG. 3 is a block diagram showing an embodiment of a hardware configuration of the manufacturing line abnormality portent detection apparatus according to the embodiment of the present invention.

The manufacturing line abnormality portent detection apparatus 30 shown in FIG. 3 is configured of a personal computer, a workstation, or the like, and comprises a processor 32, a memory 34, a display (display unit) 36, an input/output interface 38, an operation unit 39, and the like.

The processor 32 is configured of a central processing unit (CPU) or the like, integrally controls each unit of the manufacturing line abnormality portent detection apparatus 30, performs various pieces of processing based on the image for each product P captured by the radiography apparatus 20, and detects the abnormality sign of the manufacturing line 10, but the details of the various pieces of processing by the processor 32 will be described below.

The memory 34 includes a flash memory, a read-only memory (ROM), a random access memory (RAM), a hard disk apparatus, and the like. The flash memory, the ROM, or the hard disk apparatus is a non-volatile memory that stores various programs including an operation system and a manufacturing line abnormality portent detection program according to the embodiment of the present invention. The RAM functions as a work region of processing by the processor 32. The RAM transitorily stores a structure state prediction program and the like stored in the flash memory and the like.

In the memory 34, significant point information related to a significant point of the product acquired by significant point information acquisition processing of the processor 32 is stored as an inspection history for each product, and various correspondence tables and the like, which will be described below, are stored.

Among pieces of the significant point information, the significant point information that affects the determination of the presence or absence of a defect of the product is classified into defect related information and stored in the memory 34, and the significant point information that does not affect the determination of the presence or absence of the defect of the product is classified into defect unrelated information and stored in the memory 34. It should be noted that the details of the significant point information will be described below.

According to the manufacturing line abnormality portent detection program, the processor 32 uses the RAM as the work region, acquires necessary data, such as various pieces of the significant point information included in the inspection history for each product, from the memory 34 while using, and performs the control and the processing of each unit of the manufacturing line abnormality portent detection apparatus 30.

The display unit 36 displays feedback information including the detection result of the abnormality sign of the manufacturing line 10 detected by the processor 32. A user can check a soundness degree of the manufacturing line 10 based on the feedback information displayed by the display unit 36, and can perform appropriate maintenance, preservation, and the like with respect to the manufacturing line 10.

In addition, the display unit 36 can display the image of the product P acquired by the processor 32, and the user can check various significant points of the product P while viewing the image displayed on the display unit 36. It should be noted that the display unit 36 is also used as a part of a graphical user interface (GUI) in a case in which a user instruction is received from the operation unit 39.

The input/output interface 38 includes a connection unit that can be connected to an external apparatus, a communication unit that can be connected to a network, and the like. As the connection unit that can be connected to the external apparatus, a universal serial bus (USB), a high-definition multimedia interface (HDMI) (HDMI is a registered trademark), and the like can be applied. The image reading apparatus 40 is connected to the input/output interface 38, and the image reading apparatus 40 reads the X-ray image information accumulated in the imaging plate 24 of the radiography apparatus 20 shown in FIG. 2, so that the processor 32 can acquire the X-ray fluoroscopic image of the product P via the input/output interface 38.

The operation unit 39 includes a pointing device, such as a keyboard or a mouse, and a keyboard, and the like, and functions as a part of the GUI that receives various instructions by the user.

[Embodiment of Manufacturing Line Abnormality Portent Detection Apparatus]

Figure 4:
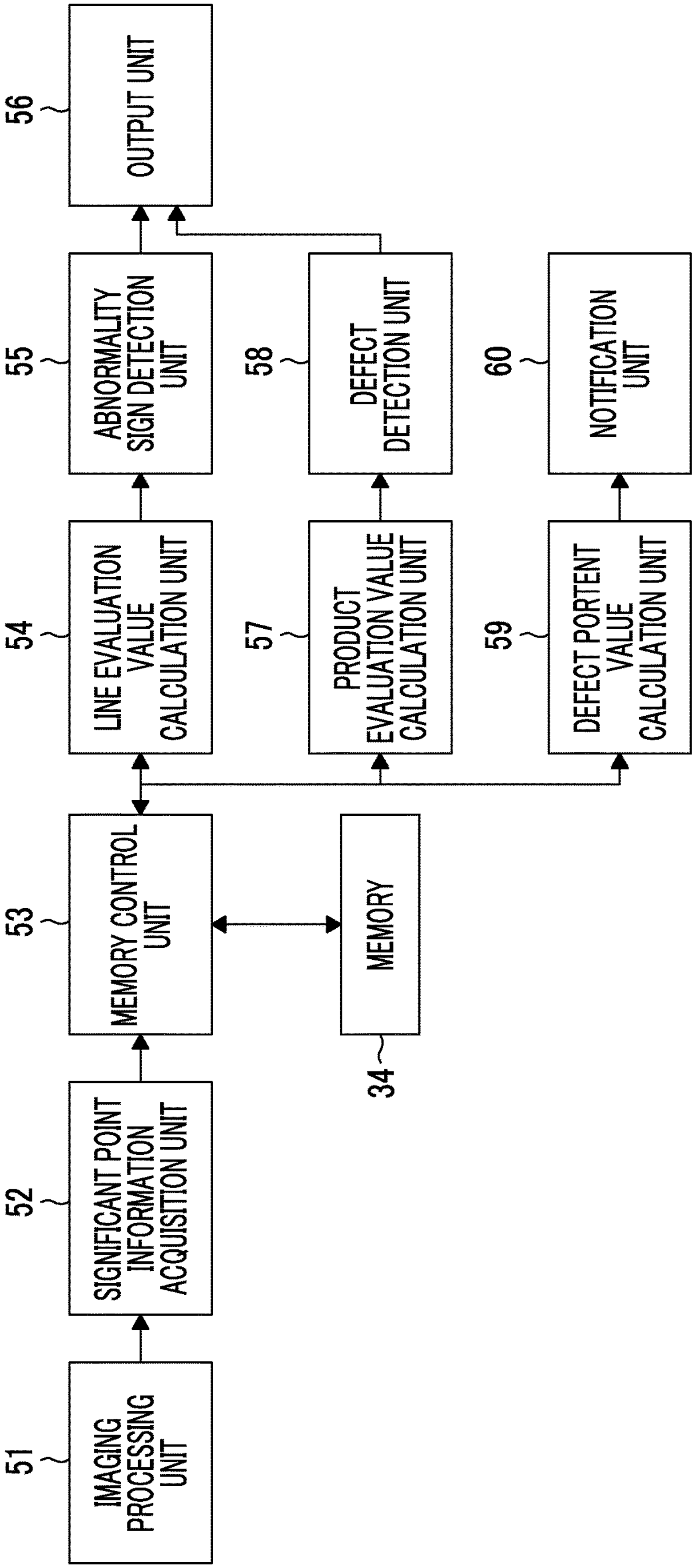
FIG. 4 is a functional block diagram showing an embodiment of the manufacturing line abnormality portent detection apparatus according to the embodiment of the present invention.

FIG. 4 is a functional block diagram showing an embodiment of the manufacturing line abnormality portent detection apparatus according to the embodiment of the present invention.

The manufacturing line abnormality portent detection apparatus shown in FIG. 4 comprises an imaging processing unit 51, a significant point information acquisition unit 52, a memory control unit 53, a line evaluation value calculation unit 54, an abnormality sign detection unit 55, an output unit 56, a product evaluation value calculation unit 57, a defect detection unit 58, a defect portent value calculation unit 59, and a notification unit 60, and the processor 32 of the manufacturing line abnormality portent detection apparatus 30 shown in FIG. 3 functions as the imaging processing unit 51, the significant point information acquisition unit 52, the memory control unit 53, the line evaluation value calculation unit 54, the abnormality sign detection unit 55, the output unit 56, the product evaluation value calculation unit 57, the defect detection unit 58, the defect portent value calculation unit 59, and the notification unit 60.

The imaging processing unit 51 is a unit that performs imaging processing of imaging the product P as an inspection target manufactured by the manufacturing line 10 one by one by using the radiography apparatus 20 automatically or according to an imaging instruction input from the user, and acquires the image of the product P captured by the radiography apparatus 20 via the input/output interface 38.

The significant point information acquisition unit 52 performs significant point information acquisition processing of acquiring the significant point information related to the significant point of the product P based on the image acquired by the imaging processing unit 51. The significant point information acquired by the significant point information acquisition unit 52 is one or more of type information, occurrence position information, size information, or shape information of the significant point of the product P. The significant point of the product P also includes a minute foreign portion that cannot be said to be the defect, and the significant point information is classified into the defect related information that is the information that affects the determination of the presence or absence of the defect of the product P and the defect unrelated information that is the information that does not affect the determination of the presence or absence of the defect of the product P.

As the type information of the significant point, a gas hole, an air bubble, a high-density foreign matter, a low-density foreign matter, a crack, a welding failure, and the like can be considered. In a case in which the product P is configured of a plurality of components, information on the component in which the significant point occurs is also one of the occurrence position information of the significant point. The welding failure includes a cavity portion (blowhole, pinhole) inside a welding metal, a penetration failure, a undercut, an overlap, and the like. The size information can be represented by an area (number of pixels) of a significant point region. Further, in a case of a spherical significant point, the size information can be represented by a diameter, and in a case of a linear significant point, the size information can be represented by a length of the significant point.

The significant point information acquisition unit 52 can be configured of, for example, artificial intelligence (AI), and in a case in which the image of the product P is input, extracts a feature amount of the image and performs class classification of which type of the significant point each pixel of the image belongs to, to extract the significant point region and to acquire the significant point information, such as a recognition result of the type of the significant point or the like. In addition, the user may visually check the significant point from the image displayed on the display unit 36, and may input the type information of the significant point, the occurrence position information of the significant point, and the like by using the operation unit 39, and the significant point information acquisition unit 52 may acquire the significant point information input by the user operation.

The memory control unit 53 performs significant point information storage processing of storing the significant point information related to the significant point of the product P acquired by the significant point information acquisition unit 52 in the memory (first memory) 34 as the inspection history for each product P, storage processing of storing the information that affects the determination of the presence or absence of the defect of the product in the memory (second memory) 34 as the defect related information and storing the information that does not affect the determination of the presence or absence of the defect of the product in the memory (second memory) 34 as the defect unrelated information, among pieces of the significant point information stored in the memory 34, in a distinguishable manner, and readout processing of reading out the inspection history or the like stored in the memory 34. It should be noted that the first memory and the second memory are not limited to different storage regions in the same memory 34, and may be memories that are physic ally different from each other.

FIG. 5 is a diagram showing an example of the inspection history stored in the memory.

The inspection history shown in FIG. 5 is the significant point information (type information of the significant point, occurrence position information of the significant point, size information of the significant point, and shape information of the significant point) related to a product number for each product, and may include a lot number, an inspection image, an inspection date and time of the product as other information.

Further, in the example shown in FIG. 5, one significant point information is stored for one product, but in a case in which a plurality of pieces of the significant point information (including a plurality of pieces of the significant point information of the same type and/or a plurality of pieces of the significant point information of different types) are acquired for one product, the plurality of pieces of the significant point information are stored.

Further, in a case of a pinhole having a small diameter, which is one of the minute significant points, it is preferable to also store information on the number of the pinholes. It should be noted that, in a case in which the number of pinholes is one, the pinhole is isolated, and in a case in which the number of the pinholes is plural, the pinholes are densely formed. In a case in which a plurality of isolated pinholes or a plurality of densely formed pinholes are present, it is preferable to store the pinholes as a plurality of pieces of the significant point information. In a case in which a plurality of pinholes are densely formed present, the region is the occurrence position of the significant point.

In addition, the product in which no significant point is detected may also be stored as the inspection history ("no significant point").

The memory control unit 53 stores the significant point information that affects the determination of the presence or absence of the defect of the product in the memory as the defect related information and stores the significant point information that does not affect the determination of the presence or absence of the defect of the product in the memory as the defect unrelated information, among pieces of the significant point information, in a distinguishable manner, but may add flag information of the defect related information or the defect unrelated information to each significant point information.

Here, in a case in which the significant point information is classified into the defect related information or the defect unrelated information, the classification can be performed based on one information of the size information, the type information, and the occurrence position information of the significant point, the number of the significant points, or the like, or a combination of a plurality of pieces of information.

For example, in a case in which the size of the significant point is very large, it can be classified into the defect related information regardless of the type information and the occurrence position information of the significant point. In addition, in a case in which the type information of the significant point is the pinhole (small air bubble or the like), it can be classified into the defect related information or the defect unrelated information based on the information of the number of the densely formed pinholes and/or the occurrence position. For example, the isolated pinhole can be classified into the defect unrelated information. In a case of the densely formed pinholes, in a case in which the number of the pinholes is less than an allowable number, or in a case in which the occurrence position of the pinhole is not an important location to which a large stress is applied, it can be classified into the defect unrelated information.

Returning to FIG. 4, the line evaluation value calculation unit 54 performs line evaluation value calculation processing of reading out the significant point information classified into the defect related information or the defect unrelated information constituting the inspection history stored in the memory 34 from the memory 34 via the memory control unit 53, and calculating a line evaluation value indicating the soundness degree of the manufacturing line 10 based on the read out significant point information.

The significant point information used for calculating the line evaluation value includes the significant point information classified into the defect related information and the significant point information classified into the defect unrelated information. Therefore, the line evaluation value calculation unit 54 calculates the line evaluation value indicating the soundness degree of the manufacturing line 10 based on the defect related information stored in the memory 34 (second memory) and the defect unrelated information stored in the memory 34 (second memory).

The line evaluation value calculation unit 54 performs the line evaluation value calculation processing of calculating the line evaluation value indicating the soundness degree of the manufacturing line 10 based on the defect related information stored in the memory 34 (second memory) and the defect unrelated information stored in the memory 34 (second memory).

The line evaluation value calculation unit 54 calculates the line evaluation value indicating the soundness degree of the manufacturing line 10 preferably based on at least one piece of the defect related information and at least two or more pieces of the defect unrelated information, more preferably based on two or more pieces of the defect related information and two or more pieces of the defect unrelated information.

It should be noted that the line evaluation value calculation unit 54 may calculate the line evaluation value indicating the soundness degree of the manufacturing line 10 based on the defect unrelated information stored in the memory 34 (second memory).

In addition, the significant point information used for calculating the line evaluation value is the significant point information (defect related information and defect unrelated information) corresponding to a plurality of products.

Here, it is preferable that the plurality of products are a product group manufactured within a certain period, a certain number of product groups manufactured in time series, or a product group of one lot which is a unit for managing the product.

A certain period may be one week, one month, or the like, and can be appropriately set by the user. In addition, an inspection history group for the product group manufactured in a certain period can be set by allowing the duplication. For example, in a case in which a certain period is one week, by shifting the one week by one day, the inspection history group corresponding to the product group manufactured in the past one week can be acquired every day. In this case, the inspection history for six days in the newly acquired inspection history group is duplicate with the inspection history of the inspection history group acquired on the previous day.

In addition, a certain number can be appropriately set by the user according to the product. A certain number of the inspection histories can be set by allowing the duplication as described above.

The quantity of the products in one lot can be appropriately set by the user in consideration of the number of stocks, the purchase of raw materials, or the like.

The line evaluation value calculation unit 54 calculates the line evaluation value indicating the soundness degree of the manufacturing line 10 based on individual significant point information in a plurality of inspection histories corresponding to the plurality of products, which is classified into the defect related information and the defect unrelated information. Specifically, the line evaluation value calculation unit 54 can count the total number of pieces of the defect related information and the defect unrelated information in the product group, and can calculate the line evaluation value based on a count value obtained by the counting. The line evaluation value may be obtained as an average value obtained by dividing the count value by the number of target products in addition to a case in which the count value itself is used as the line evaluation value.

In addition, it is preferable that, in a case in which the line evaluation value calculation unit 54 counts the total number of pieces of the defect related information and the defect unrelated information in the product group, the defect related information and the defect unrelated information are weighted and counted. It is preferable that the weights of the defect related information and the defect unrelated information are determined according to one or more significant point information out of the type information, the occurrence position information, the size information, or the shape information of the significant point.

Further, it is preferable that, in a case in which the defect related information is counted, the line evaluation value calculation unit 54 counts the defect related information by performing weighting corresponding to the type of the defect related information. It is preferable that the type of the defect related information includes type information, occurrence position information, the size information, or shape information of the defect, and the line evaluation value calculation unit 54 performs the counting by performing weighting corresponding to the content of the defect related information (for example, weighting that is larger as the size of the defect is larger or weighting corresponding to an angle of a sharp portion in the shape) in addition to weighting corresponding to the type of the defect related information itself.

The abnormality sign detection unit 55 performs abnormality sign detection processing of detecting the abnormality sign of the manufacturing line 10 based on the line evaluation value calculated by the line evaluation value calculation unit 54. Since the abnormality sign detection unit 55 can acquire the line evaluation value indicating the soundness degree of the manufacturing line 10 for each product group (inspection history group), a change in the soundness degree of the manufacturing line 10 can be predicted (abnormality sign of the manufacturing line 10 can be detected).

In addition, for example, the abnormality sign detection unit 55 can compare two or more line evaluation values corresponding to two or more product groups having different manufacturing times, and can detect the abnormality sign of the manufacturing line 10 based on the comparison result. For example, in a case in which the line evaluation value for each product group does not fluctuate, it can be determined that there is no abnormality sign of the manufacturing line 10, and in a case in which the line evaluation value for each product group tends to be increased and approaches a threshold value that can be regarded as the abnormality of the manufacturing line 10, it can be determined that there is the abnormality sign of the manufacturing line 10.

The output unit 56 performs output processing of outputting the feedback information including the detection result of the abnormality sign of the manufacturing line 10 detected by the abnormality sign detection unit 55. The output destination of the feedback information can be the display unit 36, the manufacturing line 10, or equipment related to the manufacturing line 10.

The user can check the feedback information displayed on the display unit 36, and can determine the necessity of the maintenance, inspection work, and the like of the manufacturing line 10 in advance (before a defective product is manufactured).

In addition, by outputting the feedback information to the manufacturing line 10 or the equipment related to the manufacturing line 10, a temperature, a pressure, a welding temperature, and the like of various molds and molten metals in the manufacturing line 10 can be automatically controlled, and the equipment (for example, a temperature or humidity of air conditioning equipment, raw material storage equipment, and the like) related to the manufacturing line 10 can also be automatically controlled.

<Inspection Unit>

The product evaluation value calculation unit 57 and the defect detection unit 58 function as inspection units of the product P.

The product evaluation value calculation unit 57 performs product evaluation value calculation processing of reading out the defect related information constituting the inspection history stored in the memory 34 from the memory 34 via the memory control unit 53 for each product P, and calculating a product evaluation value indicating a soundness degree of the product for each product P based on the read out defect related information. It should be noted that it is preferable to calculate the product evaluation value according to the type of the defect related information (type information, occurrence position information, size information, shape information, degree, and the like of the defect).

It is preferable that, in a case in which there is a plurality of pieces of the defect related information for one product P, the product evaluation value calculation unit 57 counts the defect related information or performs a weighted count corresponding to the type of the defect related information, and calculates the product evaluation value based on the count value obtained by the counting.

The defect detection unit 58 performs defect detection processing of detecting the presence or absence of the defect in each product P based on the product evaluation value calculated by the product evaluation value calculation unit 57. In addition, the defect detection unit 58 may perform ranking of the product for the product P detected to have no defect, based on the product evaluation value.

The output unit 56 outputs the feedback information including the defect detection result of the product P input from the defect detection unit 58 in addition to the feedback information including the detection result of the abnormality sign of the manufacturing line. The feedback information of the defect detection result of the product P can be used as information for automatically or manually sorting the product P into a good quality product and a poor quality product (defective product).

<Defect Sign>

The defect portent value calculation unit 59 and the notification unit 60 are units that perform the prediction and the notification for a possibility of future occurrence of the defect of the product P or a time of the occurrence of the defect in a case in which the product P is continuously manufactured on the manufacturing line 10.

The defect portent value calculation unit 59 performs defect portent value calculation processing of reading out the defect unrelated information constituting the inspection history stored in the memory 34 from the memory 34 for each product P via the memory control unit 53, and calculating the defect portent value based on the read out defect unrelated information.

Even in a normal region of the product (component), the tendency of the portent of the occurrence of the defect may be found from the feature amount (for example, an unevenness pattern of brightness or a degree of contrast, and in a case in which a pattern such as noise is represented, a density thereof) of the texture (reflected pattern) or the like.

In addition, even the significant point is within an allowable range (significant point does not affect the determination of the presence or absence of the defect of the product) and has a level that is not determined to be the defect at present, the significant point may be predicted to reach a level that will be evaluated as the defect in the future from the observation over time.

In a case in which the product P is continuously manufactured on the current manufacturing line 10, the defect portent value calculation unit 59 calculates the defect portent value, such as the number of the products in which the good quality product can be continuously manufactured or a manufacturing period.

The notification unit 60 is a unit that performs processing of giving notification of the defect portent value calculated by the defect portent value calculation unit 59. By giving the notification of the defect portent value, it is possible to systematically perform the maintenance of the system in advance or review the manufacturing environment, so that it is possible to efficiently perform the manufacturing. It should be noted that the notification of the defect portent value may be given from the output unit 56.

<Detection of Abnormality Sign in Each Manufacturing Process of Manufacturing Line>

The manufacturing line abnormality portent detection apparatus 30 comprises a third memory (memory 34) that stores a first correspondence table in which specific significant point information included in the significant point information related to the significant point of the product P and a specific manufacturing process related to the specific significant point information among the plurality of manufacturing processes 1 to N of the manufacturing line 10 are associated with each other.

FIG. 6 is a diagram showing a first example of the first correspondence table in which the specific significant point information included in the significant point information and the specific manufacturing process related to the specific significant point information among the plurality of manufacturing processes in the manufacturing line are associated with each other.

The first correspondence table of the first example shown in FIG. 6 shows a relationship between the significant point information (particularly, the component that generates the significant point information classified into the defect related information) and the manufacturing process.

As shown in FIG. 6, for example, in a case in which the component A of the product P is manufactured by the manufacturing process 1, the significant point information related to the component A (for example, the specific significant point information in which the occurrence position information of the significant point is the component A) and the manufacturing process 1 (specific manufacturing process) are associated with each other.

Similarly, the significant point information related to the component B of the product P (for example, the specific significant point information in which the occurrence position information of the significant point is the component B) and the manufacturing process 2 (specific manufacturing process) are associated with each other, and the significant point information related to the component C of the product P (for example, the specific significant point information in which the occurrence position information of the significant point is the component C) and the manufacturing process N (specific manufacturing process) are associated with each other.

FIG. 7 is a diagram showing a second example of the first correspondence table in which the specific significant point information included in the significant point information and the specific manufacturing process related to the specific significant point information among the plurality of manufacturing processes in the manufacturing line are associated with each other.

The first correspondence table of the second example shown in FIG. 7 shows a relationship between the significant point information (type of the significant point) and the manufacturing process.

As shown in FIG. 7, for example, in a case in which the manufacturing process 3 includes a casting process and there is a possibility that the pinhole occurs, the pinhole (specific significant point information) and the manufacturing process 3 (specific manufacturing process) are associated with each other. Similarly, in a case in which the manufacturing process 4 includes a welding process and there is a possibility that a welding defect occurs, the welding defect (specific significant point information) and the manufacturing process 4 including the welding process (specific manufacturing process) are associated with each other.

In a case in which the defect related information and the defect unrelated information in the product group are counted, the line evaluation value calculation unit 54 can count the defect related information and the defect unrelated information for each of the manufacturing processes 1 to N of the manufacturing line 10 according to the first correspondence tables shown in FIGS. 6 and 7, and can calculate the count value for each of the manufacturing processes 1 to N obtained by the counting as a process evaluation value indicating a soundness degree of each of the manufacturing processes 1 to N.

As described above, the present invention is not limited to a case in which the abnormality sign detection unit 55 detects the abnormality sign of the entire manufacturing line 10 based on the count value (line evaluation value) obtained by weighting and counting the significant point (defect related information and defect unrelated information) of the product group, the abnormality sign detection unit 55 can detect the abnormality sign of each of the manufacturing processes 1 to N of the manufacturing line 10 based on the process evaluation value calculated for each manufacturing process.

In addition, the output unit 56 can output the feedback information including the detection result of the abnormality sign of each of the manufacturing processes 1 to N of the manufacturing line 10 detected by the abnormality sign detection unit 55.

FIG. 8 is a diagram showing an example of the count value (process evaluation value for each manufacturing process) in a case in which the significant point of each product in the product group is counted for each manufacturing process.

The product group is a product group in units of lots, and in the example shown in FIG. 8, the count values of the significant points for each product group of a lot I, a lot II, and a lot III are counted for each of the manufacturing processes 1 to N.

According to the example shown in FIG. 8, in the product group of the lot III, as compared with the product groups of other lots I and II, the count value (15) of the significant point related to the manufacturing process 2 is significantly increased, and it is considered that there is a problem (abnormality sign) in the manufacturing process 2 of the manufacturing line 10.

Therefore, in a case in which the feedback information associated with the problem of the specific manufacturing process is acquired, the manufacturing line abnormality portent detection apparatus 30 can notify the user of the fact, and can urge the inspection of the specific manufacturing process of the manufacturing line 10.

It should be noted that the processor 32 can calculate the product evaluation value indicating the soundness degree of the product based on the significant point information (particularly, defect related information) of each product for each product in the product group, and may calculate the line evaluation value by integrating the product evaluation values indicating the soundness degree of each product in the product group.

<Acquisition of Specific Environment Information Related to Significant Point Information>

The manufacturing line abnormality portent detection apparatus 30 comprises a fourth memory (memory 34) that stores a second correspondence table in which the specific significant point information included in the significant point information related to the significant point of the product P and specific environment information related to the specific significant point information among a plurality of pieces of environment information indicating the manufacturing environment in the manufacturing line 10 are associated with each other.

FIG. 9 is a diagram showing an example of the second correspondence table in which the specific significant point information and the related specific environment information are associated with each other.

The second correspondence table shown in FIG. 9 shows a relationship between the specific significant point information (type of the significant point) and the specific environment information (manufacturing environment).

For example, in the casting process, a gas defect may occur due to the entrainment of $CO_2$ during filling of the molten metal. In the example shown in FIG. 9, the gas defect and the environment information ($CO_2$ excess) are associated with each other.

In addition, a crack defect may occur under the influence of the humidity and the welding temperature. In the example shown in FIG. 9, the crack defect and the environment information (inappropriate humidity/welding temperature range) are associated with each other.

In a case in which the specific significant point information is acquired based on each inspection history corresponding to the product group, the processor 32 performs processing of acquiring the specific environment information related to the acquired specific significant point information according to the second correspondence table (FIG. 9).

The output unit 56 can output the feedback information including the specific environment information related to the specific significant point information.

In a case in which the feedback information in which the significant point of the product P and the manufacturing environment can be associated with each other is acquired, it is possible to generate a control signal to an environment control apparatus. For example, in a case in which a large number of the significant points of a specific type occur and the cause of the occurrence of the significant points of the type can be narrowed down in general, or based on the characteristics of the product or experience (as shown in FIG. 9, in a case in which the gas defect is likely to occur due to a large amount of $CO_2$, and the crack defect is likely to occur in a case in which the numerical value of the humidity or the welding temperature exceeds a certain range), the control signal is automatically transmitted to the air conditioning equipment, the welding temperature, and other external environment control apparatuses, and the humidity, the welding temperature, and the management environment of raw materials, and the like are automatically adjusted to control the environment to the optimal environment. It should be noted that the user may manually adjust the air conditioning equipment, the welding temperature, and the like.

<Acquisition of Additional Information Corresponding to Quality of Product Group>

The manufacturing line abnormality portent detection apparatus 30 comprises a fifth memory (memory 34) that stores quality information indicating the quality of each product group and additional information related to the quality information in association with each other.

FIG. 10 is a diagram showing an example of a correspondence table in which the quality information indicating the quality of each product group and the additional information related to the quality information are associated with each other.

The correspondence table shown in FIG. 10 shows a relationship between the quality information indicating the quality of each product group and the additional information.

As shown in FIG. 10, the quality information indicating the quality of the product group is, for example, the rank of the best excellent quality product, the excellent quality product, the good quality product, and the like, and the additional information related to the quality information includes processing means including a product joining method in a post-process, an intended use of the product, or the like.

It should be noted that the quality information for each product group can be determined by the count value (line evaluation value) obtained by counting the significant point of the product group. In addition, the processor 32 may perform the product evaluation value calculation processing of calculating the product evaluation value indicating the soundness degree of the product based on the significant point information (particularly, defect related information) of each product for each product in the product group, and may calculate the quality information of the product group by integrating the product evaluation values of each product in the product group.

In addition, the additional information related to the quality information is not limited to the additional information shown in FIG. 10, and can be created in advance by the user as a report for the product group according to the quality information of the product and the type of the product.

In a case of the product group of the best excellent quality products that do not include even minute scratches, a sufficient strength can be guaranteed by relatively simple "screw joining" during joining, which is the post-process, and thus the additional information, such as "screw joining", is given as the joining method. In addition, it is possible to give a report to the effect that the product group can be used to an originally planned apparatus.

In a case of the product group of the good quality products that include a minute scratch although not reaching the level of the defect, the additional information, such as "press-fitting or baking-fitting at a high temperature" capable of reinforcing the strength is given as the joining method. In addition, in a case in which a sufficient strength can be guaranteed by using a more complicated and strong joining method, a report to the effect that specific use X can be used under certain conditions is given as the intended use.

In addition, in a case of the product group of the excellent quality product between the best excellent quality product and the good quality product, the additional information, such as "press-fitting or baking-fitting at a high temperature", is given as the joining method, and then the report to the effect that the product group can be used can be given to the originally planned apparatus.

The processor 32 performs processing of acquiring the quality information related to the quality of the product group based on each inspection history corresponding to the product group. Then, the processor 32 performs processing of acquiring the additional information corresponding to the quality information from the correspondence table (see FIG. 10) stored in the memory 34 based on the acquired quality information.

The output unit 56 outputs the additional information acquired to correspond to the product group. As a result, the additional information (report) appropriately selected according to the quality of the inspected product group can be provided to the shipment destination of the product group.

<Emphasis and Display of Minute Significant Point>

FIG. 11 is a diagram showing an example of an image of a product including the minute significant point.

In a case in which the product or a part of the product is a casting product, the minute significant point (gas defect candidate) at which a fine air bubble remains in the product may occur.

In the image shown in (A) of FIG. 11, nine densely formed air bubbles are present on the left side of the image and three densely formed air bubbles are present on the right side of the image.

Although the air bubbles shown in (A) of FIG. 11 are shown in a large size, the air bubbles actually have a size that is difficult to visually grasp. Even in a case in which image processing of detecting a region of the air bubble (significant point) from the image is performed and the region of the air bubble is emphasized and displayed, some air bubbles have a size that is difficult to visually grasp.

Therefore, in a case of the minute significant point that is not easily visually discriminated, by emphasizing and displaying the size or the shape of the detected minute significant point, the position and the number of the minute significant points included in the entire image can be easily visually recognized simultaneously while viewing the entire image of the imaged product.

In the image shown in (B) of FIG. 11, emphasis information capable of visually and easily discriminating the occurrence region of the minute significant point and the like is superimposed and displayed.

The emphasis information shown in (B) of FIG. 11 is mask information filling a region larger than the size of the air bubble, which is the minute significant point, with at least one of a specific color or brightness. The mask information is superimposed and filled in each of a region including the nine densely formed air bubbles and a region including the three densely formed air bubbles.

In addition, as information corresponding to the number of the minute significant points, character information (numerical) indicating the number of the minute significant points is superimposed and displayed. It should be noted that the mask information of the present example has information on at least one of color and brightness corresponding to the number of the air bubbles in the region of the mask information. In this case, even in a case in which the character information indicating the number of the minute significant points is not superimposed and displayed, the number of the minute significant points can be grasped by the color or the like.

The processor 32 performs processing of acquiring the significant point information indicating the minute significant point having a significant point size smaller than a threshold value based on the significant point information acquired by the significant point information acquisition unit 52. It is preferable to set the threshold value to a value for determining whether or not the significant point is the minute significant point having the size that is difficult to visually grasp.

It is preferable that, in a case in which the minute significant point information indicating the minute significant point is acquired, the processor 32 performs processing of generating the emphasis information emphasizing and displaying the minute significant point and displaying the region, which includes the minute significant point and is larger than the significant point size of the minute significant point, in a visible manner, and the information corresponding to the number of the minute significant points.

In a case of the minute significant points ("air bubbles" in the present example) that are densely formed and occur on the whole region, it is important to grasp information on which region and how often the minute significant points occur. Therefore, the detection results of each of the air bubbles are integrated, and the region including the densely formed air bubbles is specified.

For example, the processor 32 can acquire a region including the densely formed minute significant points by performing image processing (dilation processing) for dilating the region of the minute significant point. In a case in which the region of each of the minute significant point is magnified at a predetermined magnification ratio, in a case in which the minute significant points are densely formed, the magnified regions are connected to each other to be the region including the densely formed minute significant points. It should be noted that it is preferable to set the predetermined magnification ratio such that the magnified regions are connected and the isolated minute significant points are not connected to each other in a case in which the minute significant points are densely formed.

The processor 32 generates the emphasis information including the region larger than the significant point size and being filled with a color or a shade corresponding to the number of the minute significant points, and further generates the character information (numeral) indicating the number of the minute significant points.

The output unit 56 superimposes the emphasis information and the information corresponding to the number of the minute significant points on the image, and displays the emphasis information and the information corresponding to the number of the minute significant points on the display unit 36. In the example shown in (B) of FIG. 11, the emphasis information displayed on the display unit 36 is region information in which the region larger than the significant point size is filled, and the information corresponding to the number of the minute significant points is color or shade information of the filled region and the character information indicating the number of the minute significant points.

It should be noted that the emphasis information displayed on the display unit 36 may be contour information indicating a contour of the region larger than the significant point size or frame information (rectangular frame) surrounding the large region, and the information corresponding to the number of the minute significant points may be only information on at least one of the color or the brightness of the filled region or the character information indicating the number of the minute significant points. Further, the density of the minute significant points may be represented by information on at least one of the color or the brightness of the region to be filled.

FIG. 12 is a diagram showing another example of the image of the product including the minute significant point.

The image shown in (A) of FIG. 12 is an image in which an elongated product (component) or a welding line is imaged, and in this image, four densely formed air bubbles are present on the left side of the image and two isolated air bubbles are present on the right side of the image.

It is difficult to visually discriminate these minute significant points consisting of the air bubbles, but as shown in (B) of FIG. 12, the emphasis information obtained by filling the region larger than the size of the air bubble is superimposed and displayed on the image, and the numeral indicating the number of the minute significant points is further displayed adjacent to each emphasis information, so that the position and the number of the minute significant points can be easily visually recognized.

It should be noted that a configuration may be adopted in which the image before the emphasis information or the like is superimposed and displayed and the image on which the emphasis information or the like is superimposed and displayed are arranged and displayed on the display unit 36 or can be switched and displayed by the user operation.

In a case in which the user visually checks the significant point from the image displayed on the display unit 36 and inputs the significant point information (type information of significant point, occurrence position information of significant point, and the like) by using the operation unit 39, particularly in a case in which the user inputs the significant point information for the minute significant point, the above-described emphasis display of the minute significant point is effective.

<Other Display Examples of Significant Point>

The significant point information acquisition unit 52 can be configured of the AI as described above, but can be configured of a significant point detection model, such as a convolutional neural network (CNN), as the AI.

The significant point detection model extracts the feature amount of the image in a case in which the image of the product P is input, and performs class classification of which type of the significant point each pixel of the image belongs to extract the significant point region and to estimate the type of the significant point, but the score (=defect probability) estimated by the significant point detection model can be utilized as follows to perform display processing on the display.

(1) By making the color darker as the estimated defect probability is higher or changing the hue according to the defect probability for each pixel, the defect or a distribution of the candidates thereof is displayed on the display as the gradation or the heat map.

(2) A threshold value is set, a region in which the defect probability is equal to or higher than a certain value is specified, and then the region is binarized and displayed on the display.

(3) In a scene in which the user does not need to know a detailed shape of each pixel, a region including pixels equal to or more than the threshold value in a range wider than a pixel unit (for example, a rectangle of 24×24 pixels) is specified, and displayed by being surrounded with the emphasis frame (=bounding box).

(4) The region of (3) is emphasized and displayed by displaying an arrow or other marks on the display or by turning on and off the emphasis frame.

(5) List information (centroid coordinates and accompanying information, such as detected size or shape, as necessary) on the region determined to be equal to or more than the threshold value is output in a table format or a comma separated value (CSV) format.

Even the minute significant point that is likely to be overlooked due to the minute size in the entire image even in a case in which only the pixel corresponding to the significant point is emphasized, a possibility of the oversight is reduced, and the efficiency of the inspection can be improved, by the emphasis display or the list display as described above.

(6) For the checked region of the regions that are emphasized and displayed or displayed in list, a flag can be set or a color can be changed. In addition, the additional information, such as the necessity of re-check, can be given.

In a case in which the check work is performed comprehensively, oversight is prevented, and the efficiency of the inspection is improved.

(7) Two or more threshold values can be provided, and a "maximum range of the defect" in a case in which a low threshold value is applied and a "minimum range of the defect" in a case in which a high threshold value is applied can be displayed by a double bounding box or in a separate manner with two stages of colors.

As a result, the detection region having higher expressive power can be displayed.

For example, in a case in which there are the significant point region in which the defect probability of the entire region is low and the significant point region in which the defect probability of the central portion is high and the defect probability of the peripheral portion is low, these two significant point regions can be displayed as the significant point regions of exactly the same size in a case in which the binarization is performed with only one threshold value.

On the other hand, by providing two or more threshold values, the former significant point region can be displayed in a form (color or brightness) in which it is suspected whether or not there is the defect, and the latter significant point region can be displayed in a form in which it is certain that the central portion includes the defect and a form in which it is suspected whether or not the peripheral portion includes the defect.

In this way, by providing two or more threshold values, the display forms of two significant point regions can be made different, the user can distinguish between two significant point regions, and can focus on checking the latter significant point region that is certain to include the defect. The efficiency of the work is improved because the priority to be checked is given as compared with a case in which all the numbers are treated equally.

In addition, by outputting an intermediate class of "normal", "abnormal", and "it is ambiguous as to whether there is the defect" from the beginning by the significant point detection model, and determining the intermediate by a person, the output result may be made flexible, and a location to be checked by the person with priority may be clarified.

(8) Whether or not the region exceeding the threshold value is present in isolation in the component or the entire image, or whether a plurality of regions exceeding the threshold value are concentrated and present in a certain range are displayed in a distinguishable manner.

(9) In a case in which it is recognized in (8) that the plurality of defects are concentrated and present in a certain range, a specific spread of the region is specified and displayed.

(10) The number, the area, or the density of the plurality of significant points present in the region of (9) is calculated, and the numerical value is displayed.

(11) The regions are displayed in a distinguishable manner on the display by filling the region with the brightness, the hue, or the chroma saturation corresponding to the numerical value calculated in (10).

For example, since a porosity (=small air bubble) defect candidate has relatively low necessity of grasping each porosity defect candidate and has relatively high necessity of grasping information as to where and to what extent the occurrence of aggregated air bubbles is present, the efficiency of the inspection is improved by the display described above.

(12) In a pixel distribution after the threshold value processing of the defect probability, the area or the size of the region exceeding the threshold value is measured.

(13) In addition to (12), a similarity degree to a specific shape, such as a circular shape degree as to whether or not the region exceeding the threshold value is spread in a "circular shape" or has a "collapsed shape", is calculated.

(14) An abnormality degree or a seriousness degree of each region of interest is estimated based on (12) and/or (13).

For example, in a case in which there is prior information that the gas defect that occurs is reflected in a shape close to a "circle", since there is a possibility that the collapsed shape is an unexpected defect, the abnormality degree is regarded to be high, and a warning is issued.

In addition, for example, the defect having the "collapsed shape" or the defect having a "large size" has more advanced damage than other defects and is regarded to have high necessity/urgency for detection at an early stage (=be serious), the check is urged.

(15) By averaging or summing the calculated seriousness degree or the size of the detected defect region along a specific region (for example, a welding line), the defect possibility is sequentially calculated for each component unit or each welding location.

By preferentially checking the place in which the seriousness degree or the necessity of the re-check by the person is high, it is possible to easily respond to the abnormality at an early stage.

[Manufacturing Line Abnormality Portent Detection Method]

Figure 13:
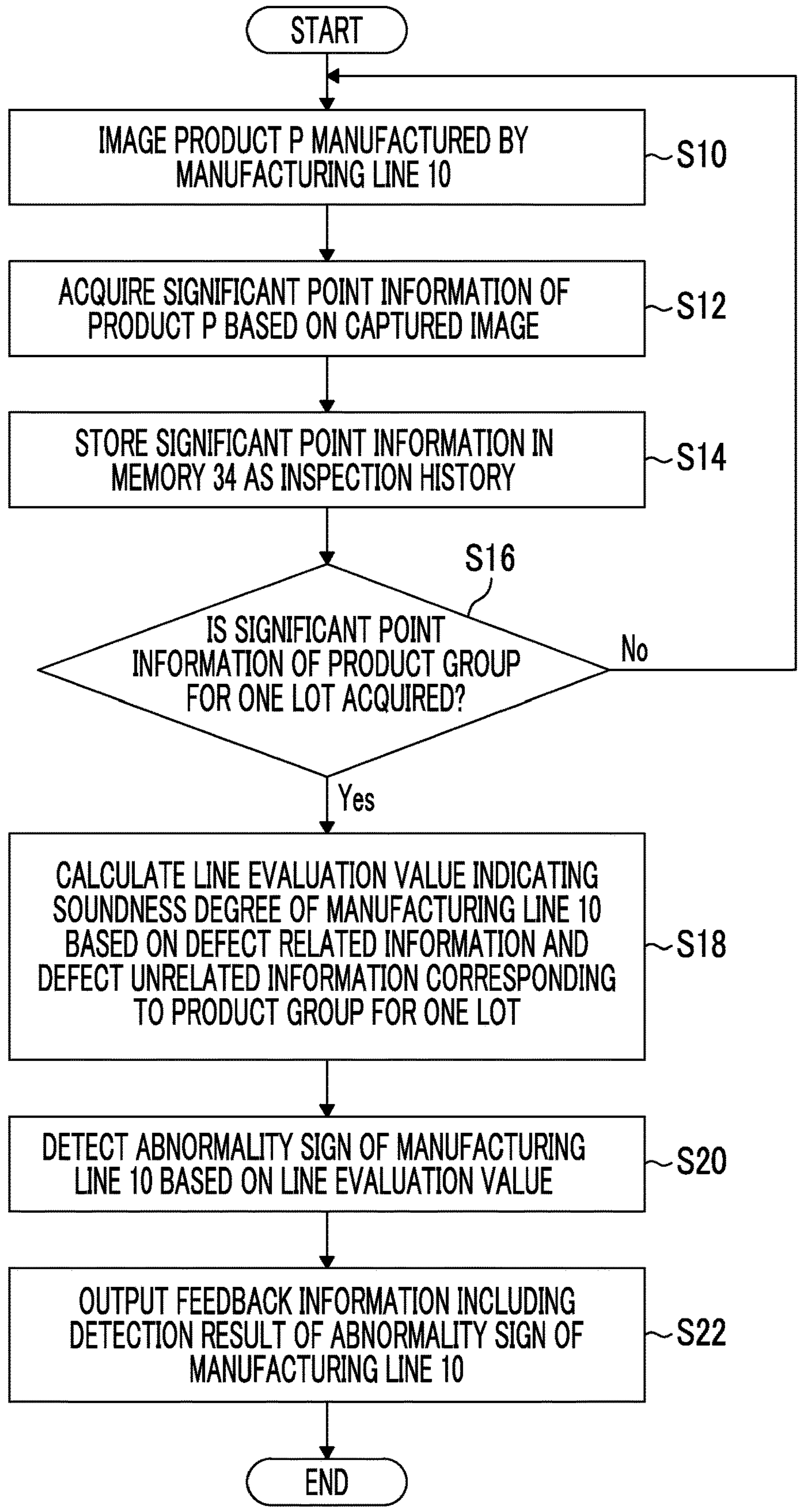
FIG. 13 is a flowchart showing an embodiment of a manufacturing line abnormality portent detection method according to the embodiment of the present invention.

FIG. 13 is a flowchart showing an embodiment of the manufacturing line abnormality portent detection method according to the embodiment of the present invention. It should be noted that the processing of each step shown in FIG. 13 is performed by the processor 32 of the manufacturing line abnormality portent detection apparatus 30 shown in FIG. 3.

In FIG. 13, the product P manufactured by the manufacturing line 10 is imaged by the radiography apparatus 20 (step S10). In the imaging of the product P by the radiography apparatus 20, the radiography apparatus 20 may be installed in a transport path of the product P manufactured by the manufacturing line 10 and the product P may be automatically imaged one by one, the product P may be imaged one by one based on the imaging instruction input from the user.

The processor 32 acquires the image (X-ray image information) obtained by imaging the product P manufactured by the manufacturing line 10 by using the radiography apparatus 20 for each product (step S12).

Subsequently, the processor 32 acquires the significant point information related to the significant point of the product P based on the image acquired by the imaging of the product P (step S12). The significant point information can be acquired by the AI. In addition, the significant point information is one or more of the type information, the occurrence position information, the size information, or the shape information of the significant point of the product P.

The processor 32 stores the significant point information related to the significant point of the product P acquired in step S12 in the memory 34 (first memory) as the inspection history for each product (step S14). In addition, the processor 32 processor stores the information that affects the determination of the presence or absence of the defect of the product as the defect related information and the information that does not affect the determination of the presence or absence of the defect of the product as the defect unrelated information, among pieces of the significant point information, in the memory 34 (second memory).

Next, it is discriminated whether or not the significant point information of the product group (plurality of products belonging to the lot number) for one lot is stored in the memory 34 (step S16). In a case in which the significant point information of the product group for one lot is not acquired and stored (in a case of "No"), the processing transitions to step S10, and the processing of step S10 to step S16 is repeated. In a case in which the significant point information of the product group for one lot is acquired and stored (in a case of "Yes"), the processing transitions to step S18.

In step S18, the processor 32 calculates the line evaluation value indicating the soundness degree of the manufacturing line 10 based on the significant point information (defect related information and defect unrelated information) corresponding to the product group in units of one lot stored in the memory 34. The line evaluation value indicating the soundness degree of the manufacturing line 10 can be calculated by counting the total number of pieces of the defect related information and the defect unrelated information in the product group and using the count value as the line evaluation value. It is preferable that, in a case in which the total number of pieces of the defect related information and the defect unrelated information in the product group is counted, the defect related information and the defect unrelated information are weighted and counted, and further it is preferable that the weights of the defect related information and the defect unrelated information are determined according to one or more significant point information out of the type information, the occurrence position information, the size information, or the shape information of the significant point.

The processor 32 detects the abnormality sign of the manufacturing line 10 based on the line evaluation value calculated in step S18 (step S20). That is, the abnormality sign of the manufacturing line 10 is indirectly detected from the quantity of the defect related information and the defect unrelated information of the product group. In addition, two or more line evaluation values of two or more product groups having different manufacturing times can be compared to detect the abnormality sign of the manufacturing line 10 based on the comparison result.

The processor 32 outputs the feedback information including the detection result of the abnormality sign of the manufacturing line 10 detected in step S20 (step S22). The output destination of the feedback information is the display unit 36 that displays the feedback information, the manufacturing line 10, or the equipment related to the manufacturing line 10.

The user can check the feedback information displayed on the display unit 36, and can determine the necessity of the maintenance, the inspection work, and the like of the manufacturing line 10 in advance.

In addition, by outputting the feedback information to the manufacturing line 10 or the equipment related to the manufacturing line 10, the temperature, the pressure, the welding temperature, and the like of various molds and the molten metals in the manufacturing line 10 can be automatically controlled, and the equipment (for example, the temperature or the humidity of the air conditioning equipment, the raw material storage equipment, and the like) related to the manufacturing line 10 can be automatically controlled.

FIG. 13 shows the processing with respect to the product group for one lot, but the same processing can be performed with respect to the product group for the next one lot to detect the abnormality sign of the manufacturing line each time the product group for one lot is manufactured.

It should be noted that, in the present example, the defect related information and the defect unrelated information corresponding to the product group in units of lots are used in a case in which the line evaluation value indicating the soundness degree of the manufacturing line 10 is calculated, but the present invention is not limited to this, and the plurality of inspection histories corresponding to the product group manufactured within a certain period or a certain number of product groups manufactured in time series can be used. In addition, the plurality of inspection histories corresponding to the product group manufactured within a certain period or a certain number of product groups manufactured in time series can be set by allowing the duplication.

Others

In the present embodiment, the product manufactured by the manufacturing line is a metal product, but the product is not limited to this, and may be a non-metal product.

In addition, the imaging apparatus is not limited to the radiography apparatus, and an ultrasound imaging apparatus or an infrared imaging apparatus can be used.

Further, in the present embodiment, for example, the hardware structure of the processing units that execute various processing, such as the central processing unit (CPU), is the following various processors. The various processors include a CPU that is a general-purpose processor executing the software (program) and functioning as the various processing units, a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC).

One processing unit may be configured of one of these various processors, or may be configured of two or more same type or different types of processors (for example, a plurality of FPGAs or a combination of the CPU and the FPGA). Moreover, a plurality of processing units may be configured of one processor. As a first example the configuration of the plurality of processing units by one processor, there is a form in which one processor is configured of a combination of one or more CPUs and software, and this processor functions as the plurality of processing units, as represented by a computer, such as a client or a server. Second, there is a form in which a processor, which realizes the functions of the entire system including the plurality of processing units with one integrated circuit (IC) chip, is used, as represented by a system on chip (SoC) or the like. As described above, various processing units are configured of one or more of the various processors described above, as the hardware structure.

In addition, the hardware structures of these various processors are, more specifically, an electric circuit (circuitry) in which the circuit elements, such as semiconductor elements, are combined.

In addition, the present invention includes the manufacturing line abnormality portent detection program causing the computer to function as the manufacturing line abnormality portent detection apparatus according to the embodiment of the present invention by being installed on the computer, and a non-volatile storage medium on which the manufacturing line abnormality portent detection program is recorded.

Further, the present invention is not limited to the embodiments described above, and it is needless to say that the modifications can be made without departing from the spirit of the present invention.

EXPLANATION OF REFERENCES

1 to N: manufacturing process
10: manufacturing line
20: radiography apparatus
22: X-ray source
24: imaging plate
30: manufacturing line abnormality portent detection apparatus
32: processor
34: memory
36: display unit
38: input/output interface
39: operation unit
40: image reading apparatus
51: imaging processing unit
52: significant point information acquisition unit
53: memory control unit
54: line evaluation value calculation unit
55: abnormality sign detection unit
56: output unit
57: product evaluation value calculation unit
58: defect detection unit
59: defect portent value calculation unit
60: notification unit
A, B, C: component
P: product
S10 to S22: step

What is claimed is:

1. A manufacturing line abnormality portent detection apparatus comprising:
a processor;
an imaging apparatus;
a first memory; and
a second memory,
wherein the processor performs
imaging processing of imaging a product as an inspection target manufactured by a manufacturing line one by one by using the imaging apparatus,
singular point information acquisition processing of acquiring singular point information related to a singular point of the product based on an image acquired by the imaging,
singular point information storage processing of storing the acquired singular point information in the first memory,
storage processing of storing information that affects a defect of the product in the second memory as defect related information and storing information that does not affect the defect of the product in the second memory as defect unrelated information, among pieces of the singular point information stored in the first memory,
product evaluation value calculation processing of calculating a product evaluation value indicating a soundness value of the product based on the defect related information,
defect detection processing of detecting presence or absence of the defect of the product based on the product evaluation value calculated by the product evaluation value calculation processing,
line evaluation value calculation processing of calculating a line evaluation value indicating a soundness value of the manufacturing line based on the defect related information and the defect unrelated information,
abnormality sign detection processing of detecting an abnormality sign of the manufacturing line based on the line evaluation value calculated by the line evaluation value calculation processing, and
output processing of outputting feedback information including a detection result of the abnormality sign of the manufacturing line and a detection result of the defect of the product.

2. The manufacturing line abnormality portent detection apparatus according to claim 1,
wherein the processor performs
defect portent value calculation processing of calculating a defect portent value based on the defect unrelated information, and
notification processing of giving notification of the defect portent value.

3. The manufacturing line abnormality portent detection apparatus according to claim 1,
wherein the imaging apparatus is a radiography apparatus, an ultrasound imaging apparatus, or an infrared imaging apparatus.

4. The manufacturing line abnormality portent detection apparatus according to claim 1,
wherein the singular point information is one or more of type information, occurrence position information, size information, or shape information of the singular point, and
in the storage processing, the singular point information is classified into the defect related information and the defect unrelated information based on one or more of the type information, the occurrence position information, the size information, or the shape information of the singular point, and stored in the second memory.

5. The manufacturing line abnormality portent detection apparatus according to claim 1,
wherein, in the line evaluation value calculation processing, the line evaluation value indicating the soundness value of the manufacturing line is calculated based on at least one piece of the defect related information stored in the second memory and at least two or more pieces of the defect unrelated information stored in the second memory.

6. The manufacturing line abnormality portent detection apparatus according to claim 1, wherein, in the line evaluation value calculation processing, the line evaluation value indicating the soundness value of the manufacturing line is calculated based on two or more pieces of the defect related information stored in the second memory and two or more pieces of the defect unrelated information stored in the second memory.

7. The manufacturing line abnormality portent detection apparatus according to claim 1, wherein, in the line evaluation value calculation processing, the line evaluation value indicating the soundness value of the manufacturing line is calculated based on the defect related information and the defect unrelated information stored in the second memory and corresponding to a plurality of the products.

8. The manufacturing line abnormality portent detection apparatus according to claim 7, wherein the plurality of products are a product group manufactured within a certain period, a certain number of product groups manufactured in time series, or a product group of one lot which is a unit for managing the product.

9. The manufacturing line abnormality portent detection apparatus according to claim 1, wherein, in the line evaluation value calculation processing, the defect related information and the defect unrelated information are counted, and the line evaluation value is calculated based on a count value obtained by the counting.

10. The manufacturing line abnormality portent detection apparatus according to claim 9, wherein, in the line evaluation value calculation processing, in a case in which the defect related information and the defect unrelated information are counted, the defect related information and the defect unrelated information are weighted and counted.

11. The manufacturing line abnormality portent detection apparatus according to claim 8, wherein, in the line evaluation value calculation processing, in a case in which the defect related information is counted, the defect related information is counted by performing weighting corresponding to a type of the defect related information.

12. The manufacturing line abnormality portent detection apparatus according to claim 1, wherein, in the abnormality sign detection processing, two or more line evaluation values are compared, and the abnormality sign of the manufacturing line is detected based on a comparison result obtained by the comparison.

13. The manufacturing line abnormality portent detection apparatus according to claim 9, wherein the manufacturing line includes a plurality of manufacturing processes, the singular point information is one or more of type information, occurrence position information, size information, or shape information of the singular point, the manufacturing line abnormality portent detection apparatus further comprises a third memory that stores a first correspondence table in which specific singular point information included in the singular point information and a specific manufacturing process related to the specific singular point information among the plurality of manufacturing processes of the manufacturing line are associated with each other, in the line evaluation value calculation processing, in a case in which the defect related information and the defect unrelated information are counted, the defect related information and the defect unrelated information are counted for each of the plurality of manufacturing processes according to the first correspondence table, and a count value for each manufacturing process obtained by the counting is calculated as a process evaluation value indicating a soundness value of each manufacturing process, and in the abnormality sign detection processing, an abnormality sign of each manufacturing process of the manufacturing line is detected based on the process evaluation value calculated for each manufacturing process.

14. The manufacturing line abnormality portent detection apparatus according to claim 1, wherein the singular point information is one or more of type information, occurrence position information, size information, or shape information of the singular point, the manufacturing line abnormality portent detection apparatus further comprises a fourth memory that stores a second correspondence table in which specific singular point information included in the singular point information and specific environment information related to the specific singular point information among a plurality of pieces of environment information indicating a manufacturing environment in the manufacturing line are associated with each other, the processor performs processing of acquiring the specific singular point information among pieces of the specific singular point information stored in the first memory, and processing of acquiring, in a case in which the specific singular point information is acquired, the specific environment information related to the acquired specific singular point information according to the second correspondence table, and in the output processing, feedback information including the specific environment information is output.

15. The manufacturing line abnormality portent detection apparatus according to claim 8, further comprising:

a fifth memory that stores quality information indicating a quality for each product group and additional information related to the quality information in association with each other, wherein the processor performs processing of acquiring the quality information related to the quality of the product group based on each inspection history of an inspection history group corresponding to the product group, and processing of acquiring the additional information corresponding to the quality information from the fifth memory based on the acquired quality information, and in the output processing, the additional information acquired to correspond to the product group is output.

16. The manufacturing line abnormality portent detection apparatus according to claim 8, wherein the abnormality sign detection processing compares two or more line evaluation values corresponding to two or more product groups having different manufacturing times, and detects the abnormality sign of the manufacturing line based on a result of the comparison.

17. The manufacturing line abnormality portent detection apparatus according to claim 16, wherein, in a case in which the line evaluation values for the respective product groups do not fluctuate, the abnormality sign detection processing determines that there is no abnormality sign of the manufacturing line, and in a case in which the line evaluation values for the respective product group tend to be increased and approaches a threshold value that can be regarded as an abnormality of the manufacturing line, the abnormality sign detection processing determines that there is the abnormality sign of the manufacturing line.

18. The manufacturing line abnormality portent detection apparatus according to claim 1, wherein the singular point information includes occurrence position information and size information of the singular point of the product, the processor performs processing of acquiring minute singular point information indicating a minute singular point having a singular point size smaller than a threshold value based on the singular point information acquired by the singular point information acquisition processing, and processing of generating emphasis information emphasizing and displaying the minute singular point based on the acquired minute singular point information and displaying a region, which includes the minute singular point and is larger than the singular point size of the minute singular point, in a visible manner, and information corresponding to the number of the minute singular points, and in the output processing, the emphasis information and the information corresponding to the number of the minute singular points are superimposed on the image, and displayed on a display.

19. The manufacturing line abnormality portent detection apparatus according to claim 18, wherein the emphasis information is mask information filling the region larger than the singular point size of the minute singular point with at least one of a specific color or brightness, or frame information surrounding the region, and the information corresponding to the number of the minute singular points is character information indicating the number or information on at least one of a color or brightness of the emphasis information corresponding to the number.

20. The manufacturing line abnormality portent detection apparatus according to claim 1, wherein, in the singular point information acquisition processing, a feature amount of the image is extracted, and a defect probability of the singular point information is acquired for each pixel of the image, and in the output processing, a color corresponding to the defect probability is added to a pixel corresponding to the singular point information, and displayed on a display.

21. A manufacturing apparatus comprising:

a manufacturing line for manufacturing a product;

a processor, an imaging apparatus;

a first memory; and a second memory, wherein the processor performs imaging processing of imaging the product manufactured by the manufacturing line one by one by using the imaging apparatus, singular point information acquisition processing of acquiring singular point information related to a singular point of the product based on an image acquired by the imaging, singular point information storage processing of storing the acquired singular point information in the first memory, storage processing of storing information that affects a defect of the product in the second memory as defect related information and storing information that does not affect the defect of the product in the second memory as defect unrelated information, among pieces of the singular point information stored in the first memory, product evaluation value calculation processing of calculating a product evaluation value indicating a soundness value of the product based on the defect related information, defect detection processing of detecting presence or absence of the defect of the product based on the product evaluation value calculated by the product evaluation value calculation processing, line evaluation value calculation processing of calculating a line evaluation value indicating a soundness value of the manufacturing line based on the defect related information and the defect unrelated information, abnormality sign detection processing of detecting an abnormality sign of the manufacturing line based on the calculated line evaluation value, and output processing of outputting feedback information including a detection result of the abnormality sign of the manufacturing line and a detection result of the defect of the product.

22. An inspection apparatus comprising:

a processor;

an imaging apparatus;

a first memory; and a second memory, wherein the processor performs imaging processing of imaging a product as an inspection target manufactured by a manufacturing line one by one by using the imaging apparatus, singular point information acquisition processing of acquiring singular point information related to a singular point of the product based on an image acquired by the imaging, singular point information storage processing of storing the acquired singular point information in the first memory, storage processing of storing information that affects a defect of the product in the second memory as defect related information and storing information that does not affect the defect of the product in the second memory as defect unrelated information, among pieces of the singular point information stored in the first memory, product evaluation value calculation processing of calculating a product evaluation value indicating a soundness value of the product based on the defect related information, defect detection processing of detecting presence or absence of the defect of the product based on the product evaluation value calculated by the product evaluation value calculation processing, line evaluation value calculation processing of calculating a line evaluation value indicating a soundness value of the manufacturing line based on the defect related information and the defect unrelated information, abnormality sign detection processing of detecting an abnormality sign of the manufacturing line based on the line evaluation value calculated by the line evaluation value calculation processing, and output processing of outputting feedback information including a detection result of the abnormality sign of the manufacturing line and a detection result of the defect of the product.

23. A manufacturing line abnormality portent detection method of detecting an abnormality sign of a manufacturing line by performing processing of the following steps via a processor, the manufacturing line abnormality portent detection method comprising:

a step of imaging a product as an inspection target manufactured by the manufacturing line one by one by using an imaging apparatus;

a step of acquiring singular point information related to a singular point of the product based on an image acquired by the imaging;

a step of storing the acquired singular point information in a first memory;

a step of storing information that affects a defect of the product in a second memory as defect related information and storing information that does not affect the defect of the product in the second memory as defect unrelated information, among pieces of the singular point information stored in the first memory;

a step of calculating a product evaluation value indicating a soundness value of the product based on the defect related information;

a step of detecting presence or absence of the defect of the product based on the product evaluation value;

a step of calculating a line evaluation value indicating a soundness value of the manufacturing line based on the defect related information and the defect unrelated information;

a step of detecting the abnormality sign of the manufacturing line based on the line evaluation value; and a step of outputting feedback information including a detection result of the abnormality sign of the manufacturing line and a detection result of the defect of the product.

24. The manufacturing line abnormality portent detection method according to claim 23, further comprising:

a step of calculating a defect portent value based on the defect unrelated information; and a step of giving notification of the defect portent value.

25. The manufacturing line abnormality portent detection method according to claim 23, wherein the imaging apparatus is a radiography apparatus, an ultrasound imaging apparatus, or an infrared imaging apparatus.

26. A non-transitory, computer-readable tangible recording medium on which a program for causing, when read by a computer, the computer to execute the manufacturing line abnormality portent detection method according to claim 23 is recorded.

* * * * *